(12) United States Patent
Humpleman et al.

(10) Patent No.: US 9,137,034 B2
(45) Date of Patent: *Sep. 15, 2015

(54) DEVICE CUSTOMIZED HOME NETWORK TOP-LEVEL INFORMATION ARCHITECTURE

(75) Inventors: Richard Humpleman, Irvine, CA (US); Dongyan Wang, Santa Clara, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 625 days.

This patent is subject to a terminal disclaimer.

(21) Appl. No.: 12/557,259

(22) Filed: Sep. 10, 2009

(65) Prior Publication Data
US 2010/0070868 A1 Mar. 18, 2010

Related U.S. Application Data

(63) Continuation of application No. 09/592,598, filed on Jun. 12, 2000, now Pat. No. 7,610,559.

(60) Provisional application No. 60/146,101, filed on Jul. 27, 1999, provisional application No. 60/149,515, filed on Aug. 17, 1999.

(51) Int. Cl.
*G06F 3/048* (2013.01)
*H04L 12/28* (2006.01)
(Continued)

(52) U.S. Cl.
CPC ........ *H04L 12/2803* (2013.01); *H04L 12/2809* (2013.01); *H04L 12/2814* (2013.01);
(Continued)

(58) Field of Classification Search
CPC .............. G06F 3/048; G06F 3/0481; H04L 67/00–67/025; H04L 67/125; H04L 12/2803–12/2838; H04L 2012/284–2012/285; H04N 1/00408–1/00464; H04N 1/32502–1/32539; H04N 21/42204; H04N 21/431–21/4318; H04N 21/43615; H04N 21/4622
USPC ................. 571/733–740, 700, 764, 853, 835; 345/326
See application file for complete search history.

(56) References Cited

U.S. PATENT DOCUMENTS

| 4,031,543 | A | 6/1977 | Holz |
| 4,860,006 | A | 8/1989 | Barall |

(Continued)

FOREIGN PATENT DOCUMENTS

| EP | 0398640 | 11/1990 |
| EP | 0140077 | 5/1995 |

(Continued)

OTHER PUBLICATIONS

Suzuki et al. (1996). Teleoperation of multiple robots through the Internet. Robot and Human Communication, 1996, 5th IEEE International Workshop.*

(Continued)

*Primary Examiner* — Andrea Long
*Assistant Examiner* — Linda Huynh
(74) *Attorney, Agent, or Firm* — Sherman IP LLP; Kenneth L. Sherman; Steven Laut

(57) ABSTRACT

A method and system for generating a user interface in a plurality of multiple devices connected to the network system for controlling devices that are currently connected to a network. A network system includes a physical layer, wherein the physical layer provides a communication medium than can be used by devices to communicate with each other, and multiple devices connected to the physical layer, one or more of said multiple devices storing information including device information. A plurality of said multiple devices each including an agent adapted for (a) obtaining information from devices currently connected to the network, said information including device information; (b) generating a user interface description in each of said one or more devices based at least on the obtained information, the user interface description in each device including at least one reference associated with the device information of each of said devices currently connected to the network; and (c) displaying one or more user interfaces each based on one of said one or more user interface descriptions, on one or more devices connected to the network capable of displaying a user interface, for user control of said devices that are currently connected to the network.

42 Claims, 14 Drawing Sheets

Alternative example of network top-level devices GUI

(51) Int. Cl.
  *H04L 12/40*   (2006.01)
  *H04L 29/08*   (2006.01)
  *H04L 12/24*   (2006.01)

(52) U.S. Cl.
  CPC ........ *H04L12/40117* (2013.01); *H04L 41/046*
  (2013.01); *H04L 41/18* (2013.01); *H04L 41/22*
  (2013.01); *H04L 67/02* (2013.01); *H04L*
  *67/025* (2013.01); *H04L 67/12* (2013.01);
  *H04L 67/16* (2013.01); *H04L 67/36* (2013.01);
  *H04L 41/0253* (2013.01); *H04L 69/329*
  (2013.01); *H04L 2012/285* (2013.01); *H04L*
  *2012/2841* (2013.01); *H04L 2012/2849*
  (2013.01)

(56) References Cited

U.S. PATENT DOCUMENTS

| | | | |
|---|---|---|---|
| 5,249,043 | A | 9/1993 | Grandmougin |
| 5,293,635 | A | 3/1994 | Faulk, Jr. et al. |
| 5,347,304 | A | 9/1994 | Moura et al. |
| 5,387,927 | A | 2/1995 | Look et al. |
| 5,389,963 | A | 2/1995 | Lepley et al. |
| 5,392,033 | A | 2/1995 | Oman et al. |
| 5,452,291 | A | 9/1995 | Eisenhandler et al. |
| 5,488,412 | A | 1/1996 | Majeti et al. |
| 5,546,484 | A | 8/1996 | Fling et al. |
| 5,561,709 | A | 10/1996 | Remillard |
| 5,572,643 | A | 11/1996 | Judson |
| 5,579,308 | A | 11/1996 | Humpleman |
| 5,612,730 | A | 3/1997 | Lewis |
| 5,727,135 | A | 3/1998 | Webb et al. |
| 5,740,362 | A | 4/1998 | Buickel et al. |
| 5,826,000 | A | 10/1998 | Hamilton |
| 5,886,732 | A | 3/1999 | Humpleman |
| 5,887,193 | A * | 3/1999 | Takahashi et al. ............... 710/8 |
| 5,940,072 | A | 8/1999 | Jahanghir et al. |
| 5,940,387 | A | 8/1999 | Humpleman |
| 5,956,487 | A * | 9/1999 | Venkatraman et al. ....... 709/218 |
| 6,005,861 | A | 12/1999 | Humpleman |
| 6,020,924 | A | 2/2000 | Jahanghir |
| 6,032,202 | A | 2/2000 | Lea et al. |
| 6,037,933 | A | 3/2000 | Blonstein et al. |
| 6,044,403 | A | 3/2000 | Gerszberg et al. |
| 6,052,750 | A | 4/2000 | Lea |
| 6,078,783 | A | 6/2000 | Kawamura et al. |
| 6,085,236 | A * | 7/2000 | Lea ............................. 709/220 |
| 6,101,499 | A | 8/2000 | Ford et al. |
| 6,121,593 | A | 9/2000 | Mansbery et al. |
| 6,133,847 | A * | 10/2000 | Yang ........................ 340/12.25 |
| 6,148,346 | A * | 11/2000 | Hanson ........................ 719/321 |
| 6,157,645 | A | 12/2000 | Shobatake |
| 6,169,725 | B1 | 1/2001 | Gibbs et al. |
| 6,175,362 | B1 | 1/2001 | Harms et al. |
| 6,181,333 | B1 | 1/2001 | Chaney et al. |
| 6,182,094 | B1 | 1/2001 | Humpleman et al. |
| 6,188,397 | B1 | 2/2001 | Humpleman |
| 6,191,781 | B1 | 2/2001 | Chaney et al. |
| 6,337,899 | B1 | 1/2002 | Alcendor et al. |
| 6,374,293 | B1 | 4/2002 | Dev et al. |
| 6,466,233 | B1 | 10/2002 | Mitani |
| 6,480,889 | B1 * | 11/2002 | Saito et al. .................... 709/220 |
| 6,502,000 | B1 * | 12/2002 | Arnold et al. ................... 700/83 |
| 6,560,639 | B1 | 5/2003 | Dan et al. |
| 6,781,518 | B1 * | 8/2004 | Hayes et al. ................ 340/12.28 |
| 7,046,161 | B2 | 5/2006 | Hayes |
| 7,574,693 | B1 * | 8/2009 | Kemink ........................ 717/121 |
| 8,032,833 | B1 | 10/2011 | Wang et al. |
| 2001/0003804 | A1 * | 6/2001 | Papadopoulos et al. ........ 700/83 |
| 2001/0011953 | A1 * | 8/2001 | Shintani et al. .......... 340/825.22 |
| 2003/0189509 | A1 | 10/2003 | Hayes et al. |
| 2006/0200253 | A1 * | 9/2006 | Hoffberg et al. ............... 700/19 |
| 2007/0089132 | A1 * | 4/2007 | Qureshey et al. ............... 725/39 |
| 2009/0326684 | A1 | 12/2009 | Wang et al. |

FOREIGN PATENT DOCUMENTS

| | | |
|---|---|---|
| EP | 0751656 | 1/1997 |
| EP | 0763936 | 3/1997 |
| EP | 0784271 | 7/1997 |
| EP | 0814403 | 12/1997 |
| EP | 0837579 | 4/1998 |
| EP | 0838768 A2 | 4/1998 |
| EP | 0457673 | 8/1999 |
| EP | 0833479 | 3/2005 |
| JP | 07-044477 | 2/1995 |
| JP | 09-261355 | 10/1997 |
| JP | 09-282263 | 10/1997 |
| JP | 10-145773 | 5/1998 |
| JP | 10-149270 | 6/1998 |
| JP | 10-191463 | 7/1998 |
| JP | 11-088406 | 3/1999 |
| JP | 11-187061 | 7/1999 |
| JP | 11-194987 | 7/1999 |
| JP | 11-317756 | 11/1999 |
| JP | 11-355294 | 12/1999 |
| JP | 11-355357 | 12/1999 |
| WO | 95/19070 | 7/1995 |
| WO | 96/21189 | 7/1996 |
| WO | 96/22644 | 7/1996 |
| WO | 97/19538 | 5/1997 |
| WO | 97/43853 | 11/1997 |
| WO | 98/59282 A2 | 12/1998 |
| WO | 98/59478 | 12/1998 |
| WO | 99/06910 | 2/1999 |
| WO | 99/57839 A2 | 11/1999 |

OTHER PUBLICATIONS

Communication from the European Patent Office, European Search Report—Supplementary, Application No. EP 00948372, Nov. 7, 2007.
U.S. Office Action for U.S. Appl. No. 09/592,598 mailed on Dec. 4, 2002.
U.S. Office Action for U.S. Appl. No. 09/592,598 mailed on Jun. 3, 2003.
U.S. Office Action for U.S. Appl. No. 09/592,598 mailed on Oct. 1, 2003.
U.S. Office Action for U.S. Appl. No. 09/592,598 mailed on Jan. 29, 2004.
U.S. Office Action for U.S. Appl. No. 09/592,598 mailed on Aug. 24, 2004.
U.S. Office Action for U.S. Appl. No. 09/592,598 mailed on Dec. 17, 2004.
U.S. Office Action for U.S. Appl. No. 09/592,598 mailed on Jan. 26, 2005.
U.S. Office Action for U.S. Appl. No. 09/592,598 mailed on Jul. 13, 2005.
U.S. Office Action for U.S. Appl. No. 09/592,598 mailed on Dec. 23, 2005.
U.S. Office Action for U.S. Appl. No. 09/592,598 mailed on Apr. 19, 2006.
U.S. Office Action for U.S. Appl. No. 09/592,598 mailed on Aug. 10, 2006.
U.S. Office Action for U.S. Appl. No. 09/592,598 mailed on Feb. 9, 2007.
U.S. Office Action for U.S. Appl. No. 09/592,598 mailed on Apr. 16, 2008.
U.S. Office Action for U.S. Appl. No. 09/592,598 mailed on Oct. 28, 2008.
Notice of Allowance for U.S. Appl. No. 09/592,598 mailed on Jun. 10, 2009.
U.S. Office Action for U.S. Appl. No. 09/592,599 mailed on Dec. 5, 2002.
U.S. Office Action for U.S. Appl. No. 09/592,599 mailed on May 21, 2003.
U.S. Office Action for U.S. Appl. No. 09/592,599 mailed on Oct. 8, 2003.
U.S. Office Action for U.S. Appl. No. 09/592,599 mailed on Jan. 30, 2004.

(56) References Cited

OTHER PUBLICATIONS

U.S. Office Action for U.S. Appl. No. 09/592,599 mailed on Sep. 22, 2004.
U.S. Office Action for U.S. Appl. No. 09/592,599 mailed on Mar. 8, 2005.
U.S. Office Action for U.S. Appl. No. 09/592,599 mailed on May 2, 2005.
U.S. Office Action for U.S. Appl. No. 09/592,599 mailed on Dec. 14, 2005.
U.S. Office Action for U.S. Appl. No. 09/592,599 mailed on Apr. 19, 2006.
U.S. Office Action for U.S. Appl. No. 09/592,599 mailed on Aug. 10, 2006.
U.S. Office Action for U.S. Appl. No. 09/592,599 mailed on Feb. 9, 2007.
U.S. Office Action for U.S. Appl. No. 09/592,599 mailed on May 24, 2007.
U.S. Office Action for U.S. Appl. No. 09/592,599 mailed on Oct. 4, 2007.
U.S. Office Action for U.S. Appl. No. 09/592,599 mailed on Apr. 16, 2008.
U.S. Office Action for U.S. Appl. No. 09/592,599 mailed on Oct. 27, 2008.
U.S. Office Action for U.S. Appl. No. 09/592,599 mailed on Jun. 11, 2009.
Communication from the European Patent Office, European Search Report—Supplementary, Application No. EP 00950068, Mar. 3, 2003.
Japanese Office Action for Japanese Application No. 2001-513157 mailed on Feb. 28, 2006.
Chinese Office Action for Chinese Application No. 0081995.9 mailed on Dec. 26, 2003.
PCT International Search Report for Application No. PCT/KR00/00820 mailed Dec. 6, 2000.
Japanese Office Action mailed Jan. 19, 2010 in Japanese Patent Application No. 13-513158, 31 pp., Japan Patent Office, Japan. (English-language translation attached).
Hyman, Michael, "How It's Done" 3rd "It's a fame-up!" Japanese version of Microsoft Interactive Developer, Sep. 1996, 11 pages, Japan.
U.S. Non-Final Office Action for U.S. Appl. No. 09/592,599 mailed on Dec. 23, 2010.
U.S. Final Office Action for U.S. Appl. No. 09/592,599 mailed on Dec. 29, 2009.
U.S. Advisory Action for U.S. Appl. No. 09/592,599 mailed on Mar. 26, 2010.
U.S. Notice of Allowance for U.S. Appl. No. 09/592,599 mailed on May 31, 2011.
U.S. Non-Final Office Action for U.S. Appl. No. 12/489,157 mailed on May 27, 2011.

* cited by examiner

Example Network Top-level Devices GUI

Alternative example of network top-level devices GUI 1394 and Non-1394 Network Scenario for address management

DEVICE CUSTOMIZED HOME NETWORK TOP-LEVEL INFORMATION ARCHITECTURE

CROSS-REFERENCES TO RELATED APPLICATIONS

Applicants claim the benefit of U.S. Provisional Application No. 60/146,101 entitled "Network Architecture," filed on Jul. 27, 1999, and U.S. Provisional Application No. 60/149,515 entitled "External Web Server Included in Home Network Top-Level User interface Description," filed on Aug. 17, 1999, which applications are incorporated herein by reference.

NOTICE OF INCLUSION OF COPYRIGHTED MATERIAL

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates to the field of networks, and more particularly, to home networks having multi-media devices connected thereto.

BACKGROUND OF THE INVENTION

A network generally includes a communication link and various devices with communication capability connected to the communication link. The devices include computers, peripheral devices, routers, storage devices, and appliances with processors and communication interfaces. An example of a network is a home network for a household in which various devices are interconnected. A usual household can contain several devices including personal computers and home devices that are typically found in the home. As such the term "device" typically includes logical devices or other units having functionality and an ability to exchange data, and can include not only all home devices but also general purpose computers. Home devices include such electronic devices as security systems, theater equipment, TVS, VCRs, stereo equipment, and direct broadcast satellite services or (DBSS), also known as digital satellite services (DSS), sprinkler systems, lighting systems, micro waves, dish washer, ovens/stoves, washers/dryers, and a processing system in an automobile.

In general, home devices are used to perform tasks that enhance a homeowners life style and standard of living. For example, a dishwasher performs the task of washing dirty dishes and relieves the homeowner of having to wash the dishes by hand. A VCR can record a TV program to allow a homeowner to watch a particular program at a later time. Security systems protect the homeowners valuables and can reduce the homeowners fear of unwanted entry.

Home devices, such as home theater equipment, are often controlled using a single common control unit, namely a remote control device. This single common control unit allows a homeowner to control and command several different home devices using a single interface. Thus, may manufacturers have developed control units for controlling and commanding their home devices from a single interface.

One drawback associated with using the remote control unit to command and control home devices is that it provides static and command logic for controlling and commanding each home device. Therefore, a particular remote control unit can only control and command those home devices for which it includes the necessary control and command logic. For example, if a remote control unit comprises logic for controlling a television (TV), a video cassette recorder (VCR), and a digital video device (DVD), but not a compact disk (CD) unit, the remote control unit can not be used to command and control the CD unit. In addition, as new home devices are developed, the remote control unit will not be able to control and command the new home devices that require control and command logic that was not known at the time the remote control unit was developed.

Further, typically a remote control unit can only be used to command and control those home devices that are within the signal range of the remote control unit. Therefore, a user cannot use the remote control unit from a single location in the house to control and command home devices that are interconnected, but located in separate areas of the home. For example, a VCR that is located upstairs in a bedroom may be connected to a TV that is downstairs in the family room. If a user wishes to play a tape contained in the VCR located upstairs in the bedroom, on the TV located downstairs in the family room, the user cannot control and command both the TV and the VCR from a single location.

Another drawback associated with using remote control units is that known remote control units cannot control a plurality of diverse devices, and more particularly, cannot control a plurality of devices having different capabilities to communicate with each other in order to accomplish tasks or provide a service. Further, conventional network systems do not provide a mechanism for software applications in different network devices to automatically communicate with one another in order to accomplish tasks without direct user command.

To alleviate the above problems, some network models provide a central/singular user interface (UI) in one device including static device information for networked devices for user control of network devices. However, in such networks a change to device information (e.g., ICON) in a device requires a change to, and rebuilding of, the top level page. Further, if the device displaying the central user interface becomes unavailable, user control of the network is curtailed. Another problem with the central/singular page is that every UI device must display the same page, and a scope is not provided for each manufacturer to generate its own UI look and feel nor alter the technology used in the UI device. The content of an icon/information representing a device cannot be changed, and a UI device cannot display a more prominent look to a device icon such as the icon for the UI device itself. Nor can a UI builder tool obtain e-business icons from an external Web Portal. Such a model cannot be standardized for industry use because a central/single UI device controls the UI.

There is, therefore, a need for a method and a system which provides dynamic control and command devices in a home network. There is also a need for such a method and system to provide the ability for one or more devices connected to the network to independently generate different user interface representations of the devices connected to the network for user command and control.

BRIEF SUMMARY OF THE INVENTION

The present invention satisfies these needs. In one embodiment, the present invention provides a method and system for generating a user interface in a plurality of multiple devices connected to the network system for controlling devices that are currently connected to a network. In one version the network system includes a physical layer, wherein the physical layer provides a communication medium than can be used by devices to communicate with each other, and multiple devices connected to the physical layer, one or more of said multiple devices storing information including device information. A plurality of said multiple devices each including an agent adapted for: (a) obtaining information from devices currently connected to the network, said information including device information; (b) generating a user interface description in each of said one or more devices based at least on the obtained information, the user interface description in each device including at least one reference associated with the device information of each of said devices currently connected to the network; and (c) displaying one or more user interfaces each based on one of said one or more user interface descriptions, on one or more devices connected to the network capable of displaying a user interface, for user control of said devices that are currently connected to the network.

In one example, network devices top-level UI description is generated independently by any network device and certainly by devices capable of displaying UI (UI device). Generating a user interface in each device rather than generating a centrally UI, allows a device to show its own device icon/text preferentially in the GUI. In addition each GUI is manufacturer customizable, user configurable and also more reliable because it does not depend on another device e.g. a single central server.

BRIEF DESCRIPTION OF THE DRAWINGS

These and other features, aspects and advantages of the present invention will become better understood with regard to the following description, appended claims and accompanying drawings where:

To facilitate understanding, identical reference numerals have been used, where possible, to designate identical elements that are common throughout the figures.

DETAILED DESCRIPTION OF THE INVENTION

Network Overview

Figure 1:
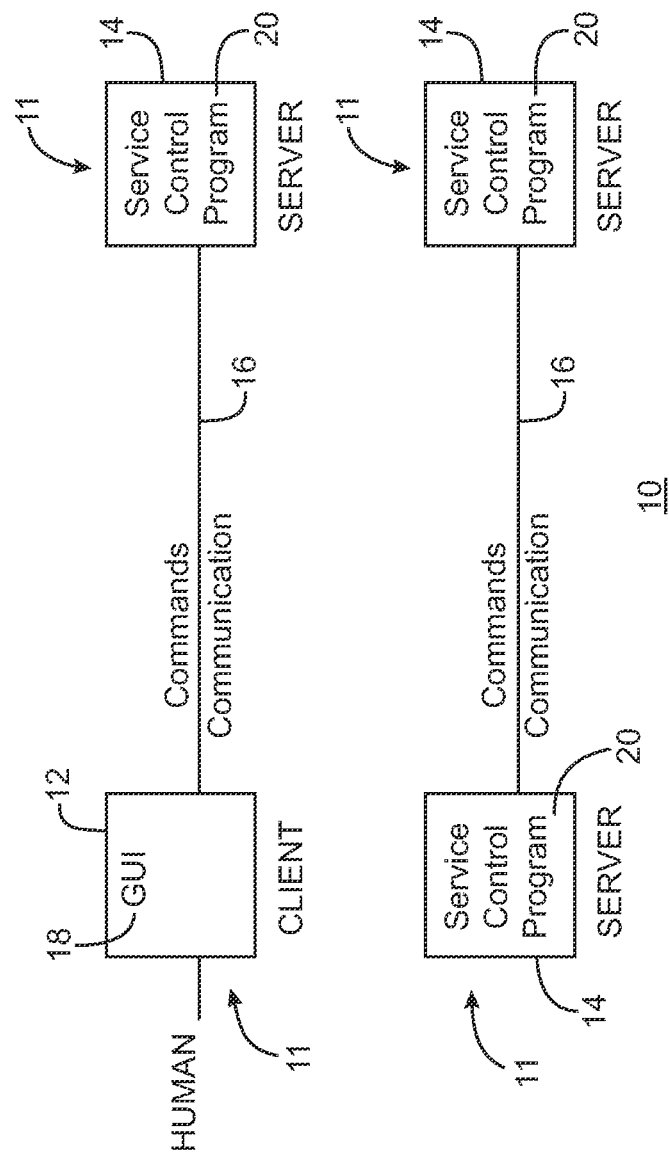
FIG. 1 shows an example block diagram of the architecture of an embodiment of a network according to the present invention.

Referring to FIG. 1, in an embodiment of the present invention, a network 10 comprises multiple devices 11 including at least one client device 12 and at least one server device 14 interconnected via a communication link 16. The communication link 16 can include a 1394 serial bus providing a physical layer (medium) for sending and receiving data between the various connected home devices. The 1394 serial bus supports both time-multiplexed audio/video (A/V) streams and standard IP (Internet Protocol) communications (e.g., IETF RFC 2734). In certain embodiments, a home network uses an IP network layer as the communication layer for the home network. However, other communication protocols could be used to provide communication for the home network. For example, the invention may be implemented using Function Control Protocol (FCP) as defined by IEC 61883, or any other appropriate protocol. Thus, a network may generally include two or more devices interconnected by a physical layer exchange or transfer of data in accordance with a predefined communication protocol.

Each client device 12 may communicate with one or more server devices 14 in the network 10. Further, each server device 14 may communicate with one or more other server devices 14, and one or more client devices 12, in the network 10. Each client device 12 can include a user communication interface including input devices such as a mouse and keyboard for receiving user input, and a display for providing a control user interface for a user to interact with the networked devices. The user interface can include a graphical user interface (GUI) 18 for providing information to the user. Each server device 14 includes hardware as a resource in the network for providing services to the user, and can further include a server or service control program 20 for controlling the server hardware.

Each server device 14 provides a service for the user, except control user interface, and each client device 12 provides a service including control user interface for user interaction with the network 10. As such, only client devices 12 interact directly with users, and server devices 14 interact only with client devices 12 and other server devices 14. Example services can include MPEG sourcing/sinking and display services.

In an exemplary embodiment of the present invention, a browser based network (e.g., a home network) uses Internet technology to control and command devices including client devices and server devices that are connected to a network. Each device includes device information such as interface data (e.g. HTML, XML, JAVA, JAVASCRIPT, GIF, JPEG, graphics files, or any other format useful for the intended purpose) that provides an interface for commanding and controlling of the device over the network. In certain embodiments, each device includes device information such as one or more Hypertext markup Language (HTML) pages that provide for the commanding and controlling of that device. Using the browser technology, the network employs Internet standards to render the HTML pages in order to provide users with a plurality of graphical user interface (GUIs) for commanding and controlling each device. In one example, the network is configured as an Intranet.

In one embodiment, a client device comprises a device providing control interface service to a human operator, including a graphical display hardware for down communication and a mouse or other point-and-click device for up (or return) communication. A server device comprises a module supplying a service, which can be any service other than a control interface provided by a client device. As such, the server/client device relationship is a control relationship, wherein the server device provides a service but a client device can use the data, as a DTV displays video data, but need not manipulate or alter the data. It is thus consistent with this definition to observe that, frequently, a server may be a source of information and a client (a browser, for example) may be a consumer of information.

Examples of specific functions which can be implemented by server devices include: return of information (data); performance of a function (e.g., mechanical function) and return of status; return of a data steam and status; reception of a data stream and return of status; or saving of a state for subsequent action. Examples of server devices include MPEG source, sink and display servers. While a server device typically includes a custom, built-in, control program to implement control of its own hardware, a client functions to interface with the server device. However, server device as used herein does not imply that a web server and a protocol stack must be used.

Figure 2:
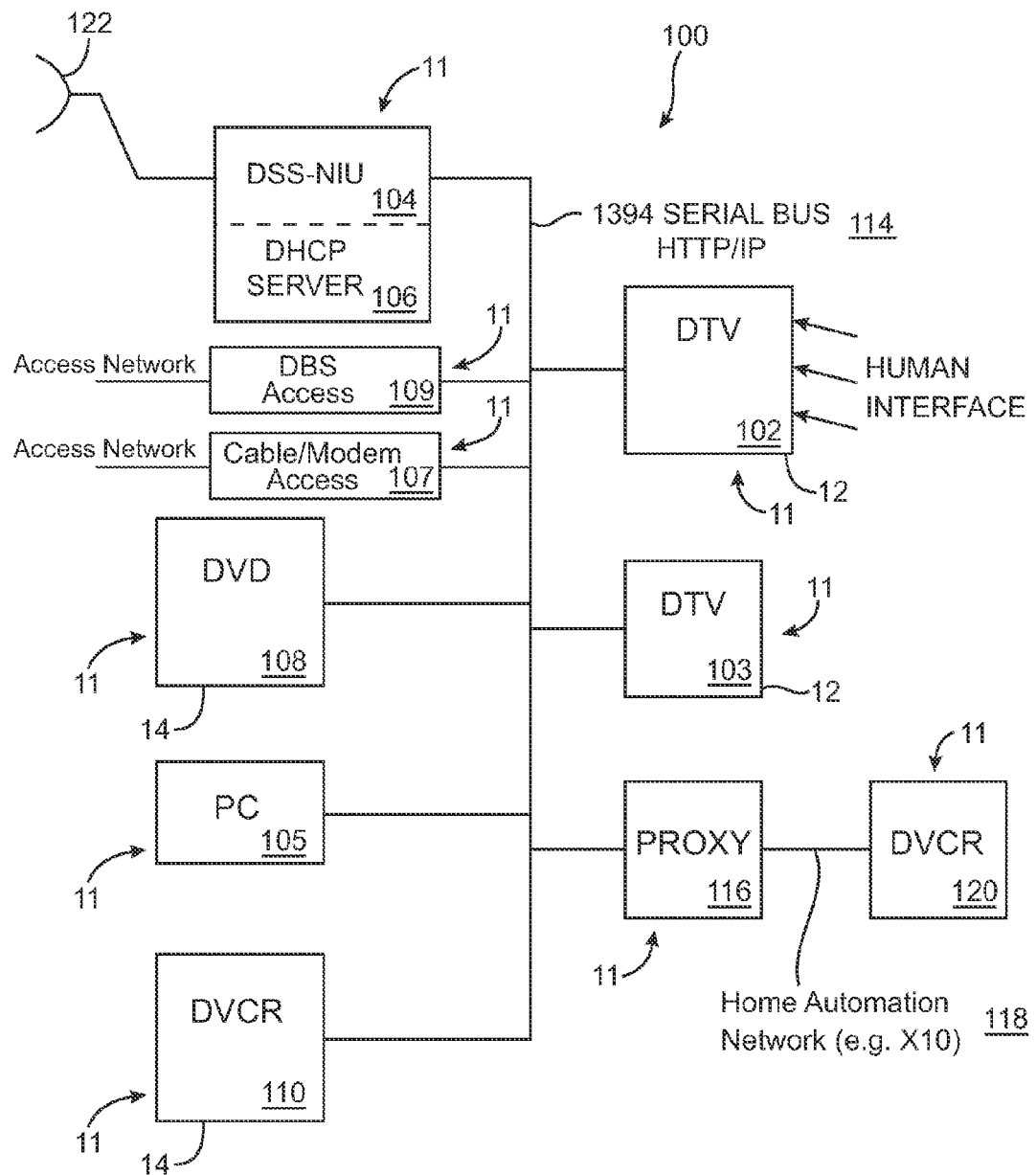
FIG. 2 shows an example block diagram of the architecture another embodiment of a network according to the present invention.
Figure 3:
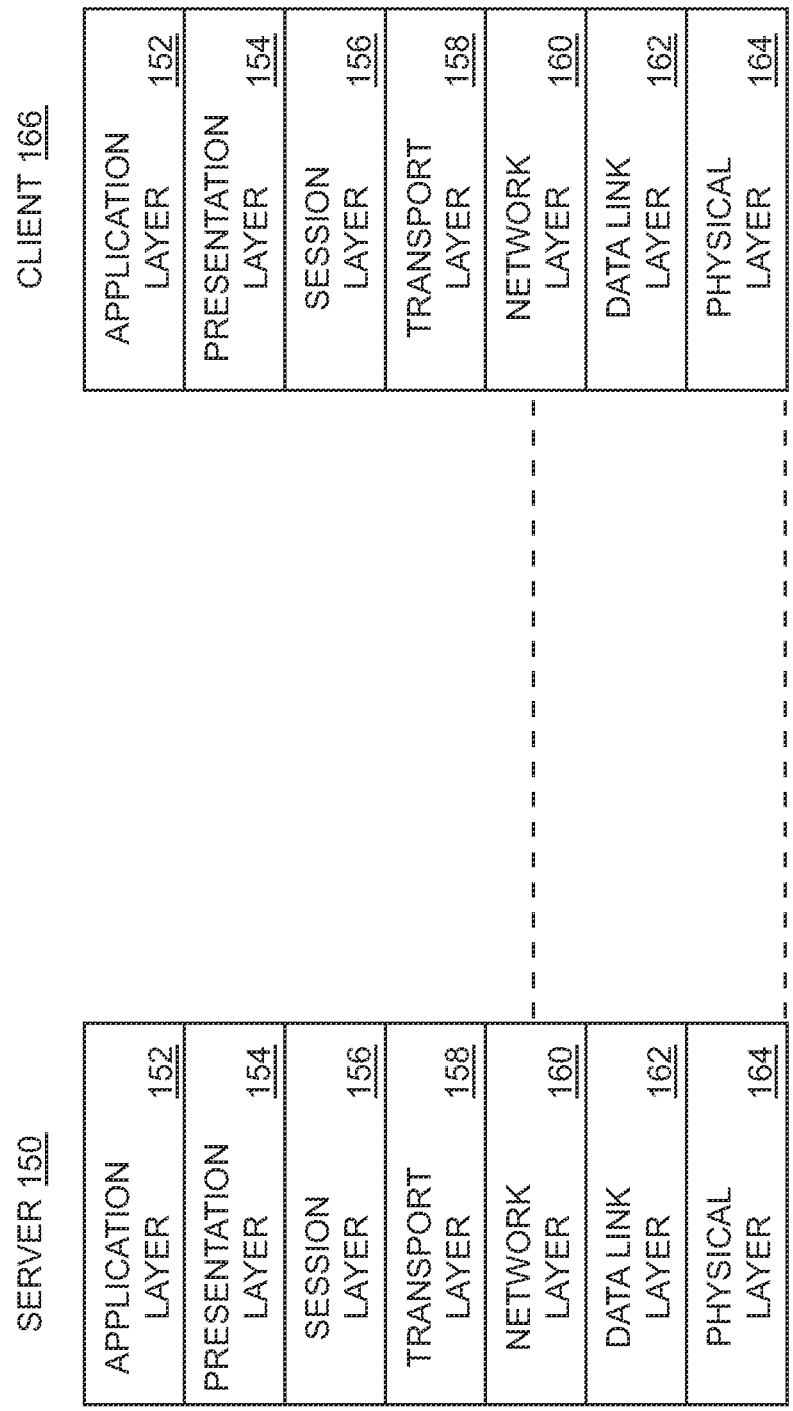
FIG. 3 illustrates an example of a layered interface model that can be used for communicating between home devices in accordance with the present invention.

FIG. 2 shows a block diagram of an embodiment of a network 100 according to an aspect of the present invention. A 1394 serial bus 114, described above, electronically connects multiple devices 11 including server devices 14 (e.g., DVD 108, DVCR 110), client devices 12 (e.g., DTV 102, 103), Bridge 116, DVCR 120, PC 105, cable/modem access 107, and DBS access 109, on the network 100. FIG. 3 illustrates an example of a layered interface model that can be used for communicating between the devices 11 in accordance with the present invention. In this example, a device (server) 150 communicates with a client device 166 using one or more of the network communication layers 152-164. In one example, an application in the device 150 communicates with an application in the device 166 via the network layer 160. The details of lower layers 162 and 164 are not seen by the applications, whereby use of e.g. either 1394 or Ethernet does not make a difference to said applications in the devices 150, 166. Further not all the upper layers of the 7-layer model are used all the time (e.g., in the Web model (TCP/IP model) session layer 156 and presentation layer 154 are not used). As such, in one version, by employing the Internet Protocol standard for the network layer 160, the devices can communicate with each other without having to know specific details about the other communication layers (i.e. application 152, presentation 154, session 156, transport 158, data link 162 and physical 164). Thus, by employing the Internet Protocol standard for the network layer 160, the network can use a combination of different communication layers in communicating between different devices.

A single physical package can include several devices which are logically networked via a network layer for example as shown in FIG. 3 not necessarily via a physical network (e.g., such devices can include a VCR and a TV in a single housing). Where a logical device accesses a GUI to enable a user to control a device, the device and the logical device can be included in the same physical package. In such an embodiment, the physical device fetches a GUI from itself. However, in other embodiments the network interconnects separate physical devices, wherein for example, a first device fetches a GUI from a second device, to permit user interaction with the GUI to control the second device.

In a presently preferred embodiment, a 1394 serial bus is used as the physical layer 164 for the data communications on the network 100. Because of its enhanced bandwidth capabilities (e.g., enhanced and guaranteed bandwidth and isochronous stream capability), the 1394 serial bus can provide a single medium for all data communications on the network 100 (i.e. audio/video streams and command/control).

Further, the 1394 serial bus provides automatic configuration reset such that when a device is plugged in/removed all the 1394 interfaces reset, the 1394 bus reconfigures and every device knows the presence of every other device (including a newly added one or without the one just removed). Also, the 1394 interface supports a data space for configuration information that is addressable from any device allowing other devices to write/read information and make modifications e.g. to permit the operation of the network layer protocol. However, it is possible to achieve these results with different software and standards. As such, the network 100 is not restricted to using a 1394 serial bus, and, in alternative embodiments of the present invention, other bus types, such a Ethernet, ATM, wireless, etc., can be used as the physical layer if they meet the particular throughput requirements of an individual network (e.g., a home network). Further, a modified version of e.g. wireless-Ethernet can include the essential features of 1394.

As depicted in FIG. 2, the network 100 includes several devices connected to the 1394 serial bus 114. In this example, the devices include a DBSS 104 for receiving transmission signal from a satellite 122 for subsequent display. Associated with the DBSS is a network interface unit ("NIU") which, among other things, provides an interface between the DBSS satellite transmission and the 1394 serial bus 114.

A digital video device (DVD) 108 is also connected to the exemplary network 100. The DVD 108 can be used to display digitally encoded videos on a television. Also connected to the exemplary network 100 is a digital video cassette recorder (DVCR) 110, i.e., a digital TV 102. In this example, the DTV 102 provides a human interface for the network 100 by employing browser technology to allow users to control and command for devices over the home network 100. A second DTV 103 provides another human interface for the network 100 by employing browser technology to allow users to control and command for devices over the home network 100. The DTVs 102 and 103 can provide human interfaces for the network 100 as each DTV comprises a screen for displaying HTML pages. However other devices having display capability can be used to provide human interfaces. Thus, in certain embodiments of the invention, a device such as the personal computer 105 (PC) is used to provide a human interface for a respective home network, as a PC 105 typically embodies a screen display unit.

The 1394 serial bus 114 is depicted as using the HTTP/IP interface protocol, and preferably HTTP/TCP/IP, wherein IP provides packet format (a one-way write only model), TCP provides an error free version of IP (e.g., ensures packets arrive and in correct order), and HTTP provides 2-way connection (packet to server will expect a response—a 'read' model). Certain devices can require other protocol interface types (e.g., UPD/IP, FTP/IP, TELNET/IP, SNMP/IP, DNS/IP, SMTP/IP). In certain embodiments of the invention, a proxy 116 can be used to interface two networks using dissimilar interface protocols on their respective mediums which, when connected, comprise the network 100. The proxy 116 (e.g. Web proxy) can include Home Automation type protocols such as the HTML/HTTP/TCP/IP proxy for X10, Lonworks, CEBus (on their respective physical technologies), or non-IP protocols on 1394 (e.g., AVC/FCP/1394).

In certain embodiments, the two network mediums are of the same type. For example, as depicted in FIG. 2, the 1394 serial bus 114 using the HTTP/IP interface protocol is connected by a proxy 116 to the Home Automation neutral 118 (e.g., X10). By using the proxy 116 as HTML/HTTP/CTP/IP/1394 proxy for VCR-Commands/AVC/FCP/1394, to interface between HTML/HTTP/TCP/IP and X10 protocols, DVCR 120 is also accessible on the network 100. In certain other embodiments, a network can comprise two network mediums of dissimilar types, e.g., a 1394 Serial bus and Ethernet. Therefore, in certain embodiments of the invention, a proxy is used to interface two dissimilar medium types to from a single network. A discovery process, described further below, can be used for the discovery of devices that are powered on and connected to the network 100. Also, the same 1394 bus can be used without need for a bridge box.

As depicted in FIG. 2, devices 11 including DTV 102, DTV 103, PC 105, DVCR 110, DVD 108, DSS-NIU 104 and DVCR 120 represent devices that are currently connected to the network 100 comprising a 1394 network. A client-server relationship exists among the attached devices, with the DTV 102, DTV 103 and PC 105 typically behaving as clients and devices DVCR 110, DVD 108, DSS-NIU 104 and DVCR 120 behaving as servers.

A typical 1394 network comprises interconnected devices such as a collection of appliances including server devices offering one or more services to be controlled (e.g., DVCR 100 as an MPEG video recording and replay service), and client device offering a user interface (UI) service (e.g., DTV 102) for controlling the server devices. Some appliances (e.g., DTV 103) can have both services (e.g., MPEG decode and display capability) to be controlled, and a UI controller capability. According to an aspect of the present invention, methods and systems including protocols, document description, image compression and scripting language standards from technologies utilized in the World Wide Web standard (Web model) are used to implement t a 1394WEB user-to-device control model in the network 100. The Web model is a client/server model. The controlled server device (service) comprises a Web server and the controller client device (i.e., a device capable of displaying a UI) comprises a Web client including a GUI presentation engine, described further below, such as a Web browser (e.g., Explorer™, Netscape™, etc.).

User Device Control

Figure 4A:
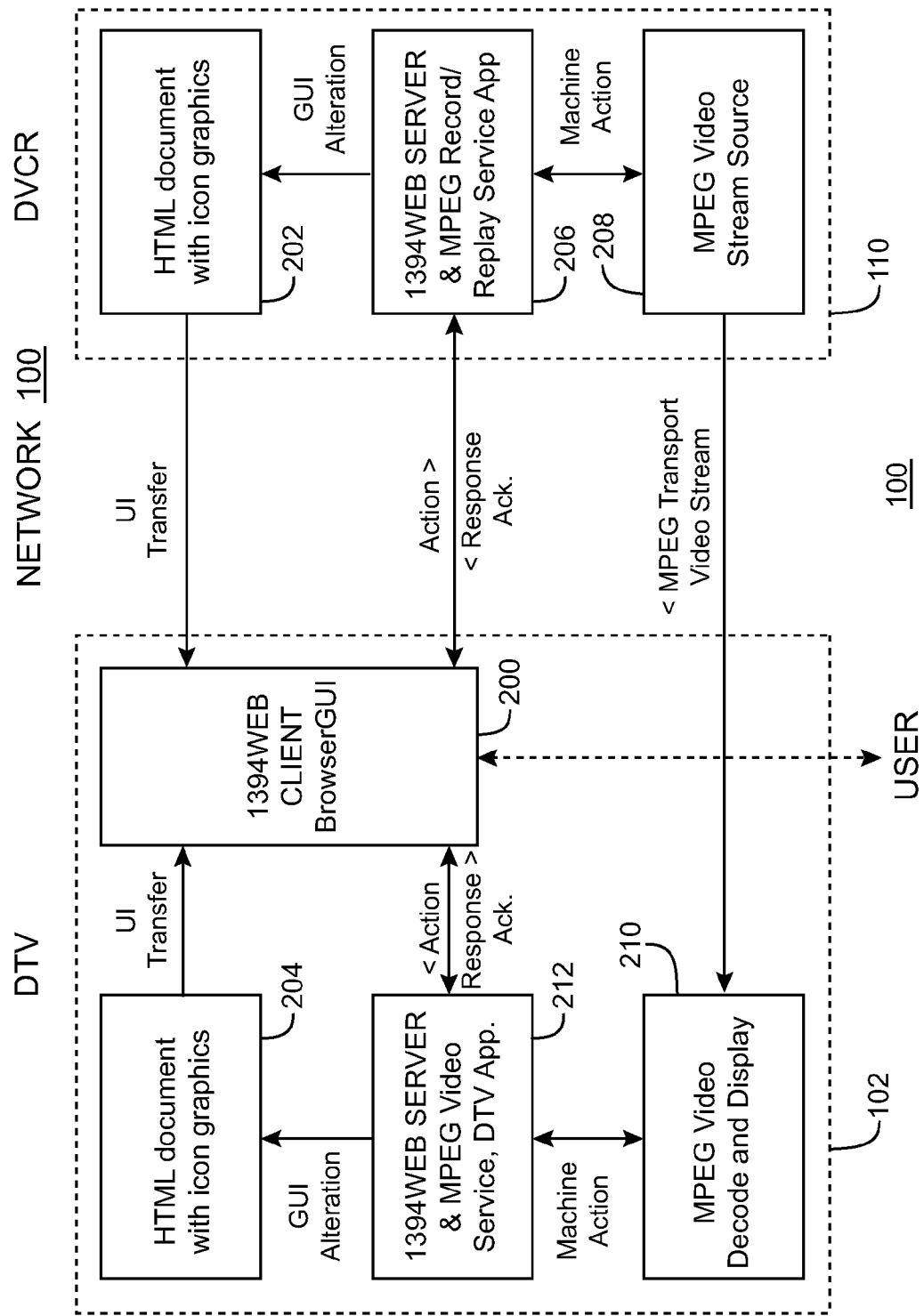
FIG. 4a shows an example architecture diagram of a DVCR server device replaying video to a DTV client device capable of displaying a user interface, in a network according to the present invention.

FIG. 4a shows a server device such as the DVCR 110 replaying MPEG video to a client device such as the DTV 102 in a network 100 according to the present invention, wherein the DTV 102 can display a user interface. The DVCR 110 includes Web server hardware and software and the DTV 102 includes Web browser software. A user can utilize the DTV 102 to request that the DTV 102 display a user interface based on the device information 202 contained in the DVCR 110 or based on the device information 204 contained in the DPV 102. For example, the user can utilize a browser 200 in the DPV 102 to display an HTML control page GUI 202 contained in the DVCR 110 or an HTML control page GUI 204 contained in the DIV 102. Each page 202, 204 includes graphical user interface description information in HTML, wherein the browser 200 reads that information to generate a graphical user interface. Each page 202, 204 represents the Control Interface of the Applications 206, 212, respectively. Each page 202, 204 can include a hierarchy of pages to represent a corresponding application control interface.

Each GUI 202 and/or 204 includes active control icons and/or buttons for the user to select and control devices currently connected to the network 100. If, for example, the user selects a PLAY button in the GUI 202 of the DVCR 110 displayed by the browser 200 on the DTV 102, a hyperlink message is returned to the DVCR 110 Web server and directed to an application software 206 (e.g., MPEG Record/Replay Service Application Software) in the DVCR 110 for operating a DVCR hardware 208. In one example, an MPEG video stream source 208 in the DVCR 110 transmits an MPEG video stream to an MPEG vide decode and display system 210 in the DIV 102 for display under the control of application control software 212 in the DIV 102. The application software 206 in the DVCR 110 also sends information back to the application software 212 in the DTV 102, including e.g. an acknowledgment if the operation is successful, or an altered or different control GUI 202 to the DIV 102 indicating status to the user. There can be further communication between the application softwares 206 and 212 e.g. for setting up a 1394 isochronous video stream connection for video stream service.

Figure 4B:
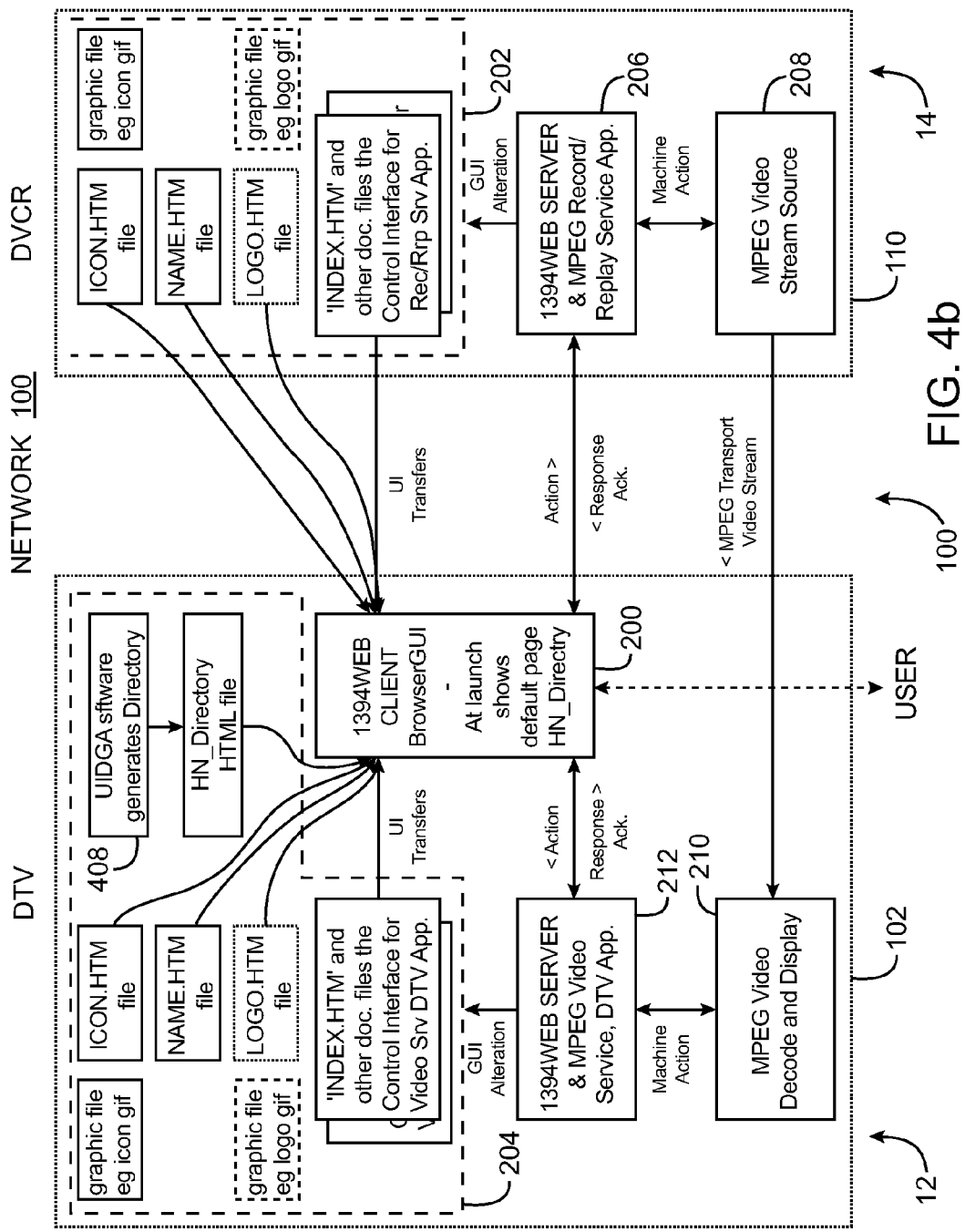
FIG. 4b shows another example architecture diagram of a server device communicating with a client device capable of displaying a user interface, in a network according to the present invention.

FIG. 4b shows another example architecture diagram of a server device communicating with a client device capable of displaying a user interface, in a network 100. The server device such as DVCR 110 replays MPEG video to the client device such as the DTV 102 in the network 100, wherein the DTV 102 can display a user interface.

Communication Protocol

In an embodiment of the invention, the communication protocol between devices in the network 100 is based on the Hypertext Transfer Protocol (HTTP 1.1), an application-level protocol for distributed, collaborative, hypermedia information systems. HTTP is a generic, stateless, object-oriented protocol that can be use for many tasks. A feature of HTTP is the typing and negotiation of data representation, allowing devices to be built independently of the data being transferred over the network 100 to which the devices are connected.

GUI Description Language

The description document language for defining various GUIs 202, 204 can be e.g. HTML, version 4.0, the publishing language of the World Wide Web. HTML supports text, multimedia, and hyperlink features, scripting languages and style sheets. HTML 4.0 is an SGML application conforming to International Standard ISO 8879—Standard Generalized Markup Language.

Image Compression Formats

To display images, three still image graphics compression formats specified by the HTML specification are utilized in the 1394WEB network 100 for ICON, LOGO and other graphics. The still image graphics compression formats are: Graphics Interchange Format (GIF89s), Progressive Joint Photographic Experts Group (JPEG) and Portable Network Graphics (PNG). Table 1 shows the differences in capabilities between the three different still image graphics compression formats.

TABLE 1

Still Image Compression Formats

|  | PNG | Progressive JPEG | GIF89a |
|---|---|---|---|
| Color Depth | 48 bit | 24 bit | 8 bit |
| Colors Supported |  | 16.7 million | 256 |
| Formats Supported | Raster, Vector | Raster | Raster |
| Compression Scheme | LZ77 derivative | JPEG | LZW |
| Transparency | Per Pixel for Grayscale & RGB, Per Color for Indexed, 256 levels | No | Single Color, 2 levels (Binary) |
| Progressive Display | Yes | Yes | Yes |
| Scalable | No | No | No |
| Animation |  | No | Yes |
| Lossless Compression | 100% |  |  |
| Truecolor | 48 bits |  |  |
| Grayscale | 16 bits |  |  |
| Indexed-color | yes |  |  |
| Gamma Correction (light intensity) | Yes |  |  |
| Chromaticity Correction | Both |  |  |
| Searchable Meta-Data | Yes |  |  |
| Extensibility | Yes, chunk encoded |  |  |

Scripting Language

Further, the Web scripting language, ECMA-Script-262, is utilized to provide a means for visually enhancing the GUI Web pages 202 as part of a Web-based client-server architecture. The scripting language is a programming language for manipulating, customizing, and automating the facilities/services of the devices. The user interface 200 provides basic user interaction functions, and the scripting language is utilized to expose that functionality to program control. The existing system provides the host environment of objects and facilities completing the capabilities of the scripting language. The web browser 200 provides the ECMA-Script host environment for client-side computation including, for example, objects that represent windows, menus, pop-ups, dialog boxes, text areas, anchors, frames, history, cookies, and input/output.

The web browser 200 provides the host environment for the EXMA-Script-262, and the host environment supports attaching scripting code to events such as change of focus, page and image loading, unloading, error and abort, selection, form submission, and mouse actions. Scripting code is included within the HTML pages 202 and 204 and the displayed page is the browser 200 includes a combination of user interface elements, and fixed and computed text and images. The scripting code responds to user interaction without need for a main program.

Client Device Specification

In one example, the specification for a 1394WEB client browser 200 includes HTTP1.1 specification, wherein section '8.1.2.1 Negotiation' of the HTTP1.1 specification regarding connection persistence is modified such that an HTTP1.1 client device such as e.g. the DTV102 expects a connection to server device such as e.g. the DVCR 110 via the 1394 to remain open, because the persistent connection in 1394WEB user control allows full status reporting from the server device (DVCR 110) while the GUI 202 and/or 204 remains visible in the browser 200 of the client device (DTV 102). The HTTP connection remains open (HTTP spec RFC 2068) wherein a client that supports persistent connections may "pipeline" its requests (i.e., send multiple requests without waiting for each response). A server must send its responses to those requests in the same order that the requests were received. This allows the web browser 200 to pipeline requests to the DVCR 110 which the DVCR 110 can then satisfy later with e.g. status responses such as Now Playing, Now Recording, Rewind Finished, Tape Broken, Etc. Other example implementations include e.g. the control page from the DVCR 110 can contain a request to loop on the DVCR 100 request of GUI description 202.

The GUI presentation engine 200 is utilized in the client device such as the DTV 102 to interpret GUI descriptions 202, 204 written in the HTML4.0 document description language and the associated specifications (below), and to create the graphical form for display to the user. The GUI presentation engine 200 includes the following e.g. attributes: (1) window (GUI) minimum default size of e.g., H0x640 pixels (480×640 where 480 vertical, 640 horizontal). This default size is to insure the intended appearance in the GUIs 202, 204 is transferred to the user in the browser 200. The transferred GUIs 202, 204 are displayed in a window 480×640 pixels or magnified larger with the same aspect ratio unless otherwise directed by the user; (2) still image compression formats: e.g., GIF89a, JPEG, and PNG; (3) style sheet formats and fonts: e.g., CSS1 and CSS2; (4) fonts such as the following e.g. built-in fonts are required for the client device to free simple server appliances from having to support such fonts. Minimum one font from each generic Latin family can be selected: e.g., Times New Roman, from 'serif' family; Helvetica, from 'sans-serif' family; Zapf-Chancery, from 'cursive' family; Western from 'fantasy' family; and Courier from 'monospace' family. Other fonts can also be utilized; and (5) scripting language e.g., ECMA-262. Examples of the GUI presentation engine 200 include Web browsers such as Explorer™ and Netscape™ configured/customized as desired.

Server Device Specification

One or more of the server devices (e.g. a 1394WEB network, controlled appliance Web server such as the DVCR 110), include the following six enumerated components:

(1) HTTP1.1 web server protocol, with section '8.1.2.1 Negotiation' of the HTTP1.1 specification regarding connection modified such that an HTTP1.1 server device (e.g. DVCR 110) assumes that a HTTP1.1 client device (e.g., DTV 102) intends to maintain a persistent connection with the server device. The persistent connection in the 1394WEB network 100 allows full status reporting from e.g. the server device DVCR 110 to the client device DTV 102 while the GUI 202 of the DVCR 110 remains visible in the browser 200 of the DTV 102. Further, a method using HTTP conditional GET to obtain the latest status of server devices can be used. Whenever the user returns to the home network directory or causes it to be refreshed, the browser 200 redisplays the page in its entirety. This is necessary because the HTML that underlies the home network directory may have been regenerated if a device has been added to or removed from the network 100. It is also possible for device icons to be updated to reflect changes in their device's operating state. As such, browsers implemented by EIA-775.1 devices utilize HTTP "conditional get" requests to determine whether or not fresh copies of web pages or graphics should be retrieved from the server.

(2) Device home page GUI descriptions 202, 204 written e.g. in HTML4.0, include file e.g. icon.htm, name.htm, logo.htm, index.htm, gif files, etc. The file index.htm is referenced by HTML links included in device icon.htm and name.htm HTML files, wherein index.htm can be optionally named e.g. "INDEX.HTML" or "INDEX.HTM". File named INDEX.HTM is not required to be a standard name because the ICON.HTM and NAME.HTM are made with hyperlinks to the 'INDEX.HTM', therefore the name is arbitrary. ICON.HTM and LOGO.HTM reference the actual graphics files in the same device e.g. LOGO.G1F and ICON.GIF. The descriptions 202, 204 are accessible by the devices (e.g., HTTP devices) in the network 100. To guarantee a desired appearance, the control GUI design can be for a default GUI size of e.g. 480×640 pixels. For example, a transferred GUI 202 can be displayed in a window of 480×640 pixels in the browser 200 or magnified larger with the same aspect ratio unless otherwise directed by the user.

(3) At least two device ICON files are provided to represent the device in a top-level network page 220 (FIGS. 5-6) in the browser 200 showing information about the devices connected to the network. An ICON can comprise a graphic file type (e.g. GIF, JPG or PNG) and named ICON.HTM. In one example, ICON.HTM(DVCR) references the INDEX.HTM file in the HTML page 202 and ICON.HTM(DTV) references the INDEX.HTM file in the HTML page 204. The top-level link for the control pages (e.g., INDEX.HTM) of the device can be ICON.HTM. The browser 200 places the icons and links therein) of a plurality of devices in the network 100 in the top-level HN directory page 229 for service discovery by the user. Then user clicks the ICON displayed in the page 220 and the device page (e.g. INDEX.HTM in page 202) is fetched. The default displayed HN directory is the top-level discovery page.

A number of additional and different graphic icons can also be utilized, for example, to represent device status, user configured preference or manufacturers formats which may be substituted for the icon graphic. In a discovery process described further below, ICONs from the devices connected to the network 100 are collected together and displayed in the top level network devices page 220 for selection by a user. An example device ICON specification comprises: File name ICON.HTM accessible by the HTTP server (files names are in a directory, file space, accessible by the web server so that they can be retrieved and forwarded over the network to the browser); Graphic file type such as GIF, JPG or PNG; and Icon graphic with a maximum size of 70(V)×130(H) pixels.

(4) At least two device LOGO files are provided to represent the device in the top-level network devices page. LOGO can comprise a graphic file type (e.g., GIF, JPG or PNG) and named LOGO.HTM. In one example, LOGO.HTM(DVCR) references the INDEX.HTM in the HTML page 202 and LOGO.HTM(DTV) references the INDEX.HTM in the HTML page 204. In one version, the top-level link for the control pages (e.g., INDEX.HTM) of the device can be LOGO.HTM. All device logos are placed in the top-level HN directory page 220 for service discovery by the user. Then user clicks the LOGO displayed in the page 220 and the device page (e.g. 202) is fetched. A number of additional and different graphics for manufacturer services can be substituted for the logo graphic format. According to the discovery process, LOGOs from devices connected to the network 100 are collected together and displayed in the top level network devices page 220 for selection by a user. An example device LOGO specification comprises: File name LOGO.HTM accessible by the HTTP server; Graphic file type such as GIF, JPG or PNG; and logo graphic maximum size of about 70(V)×130(H) pixels.

(5) At least one device NAME is provided to represent the device in the top-level network devices page. NAME comprises TEXT in an HTML file NAME.HTM. This text can also reference control pages (e.g., 202). This is a top-level link in the discovery page to the control interface of the device. The text provides a way to distinguish identical devices whereby for e.g. two identical DTV's can be distinguished by adding NAME text 'Bedroom TV' and 'Family Room TV'. The text can comprise a few words to clearly represent the device type e.g. DVCR or DTV. According to the discovery process, NAMEs from devices connected to the network are accessed along with corresponding ICONs/LOGOs and displayed in the top level network devices page 220 under the ICON/LOGO. An example NAME specification comprises: File name NAME.HTM accessible by the HTTP server; Text unspecified, such as, with Font size 10, two lines of text can be displayed under the corresponding ICON/LOGO. Therefore, for example the space size for the NAME.HTM text can be 20 vertical by 130 horizontal to match the ICON/LOGO (70 vertical×130 horizontal). As shown by example in FIGS. 5-6, the format of the top-level UI 220 can comprise a matrix of icons representing the functions of the networked devices to the user. The name representing the device (from name.htm) is placed under the icon (from icon.htm) from the same device. Logo (from logo.htm) may be placed e.g. in any vacant icon position. As the Top-level description 250 (described further below in conjunction with FIG. 9a-c) is generated independently by UI capable devices, the exact design need not be prearranged. The icon, logo and name maximum sizes can be prearranges to facilitate design of the GUI matrix.

(6) A device information summary home page description document written in HTML4.0 can be provided, named e.g. "info.html" or "info.htm", and made accessible by the HTTP server for the discovery process. A link can be provided to INFO.HTM information via control pages e.g. 202, 204. The device information summary homepage provides the user a device summary instead of the detailed control interface as shown in the device homepage. Table 2 shows device attributes text that are included and others that can be included. This table can be extended to included other attributes.

TABLE 2

Device information summary

| Name | Value |
| --- | --- |
| Device Name | Device name (user configurable) |
| Device Location | Device location in home (user configurable) |
| Device Icon | Current Device ICON name |
| Device Type | Device type or category (VCR, DSS, TV, etc.) |
| Device Model | Device model |
| Manufacturer Name | Name of device manufacturer |
| Manufacturer Logo | Manufacturer Logo image name |
| Manufacturer URL | Device manufacturer's URL |
| Stream Source Name Default | Service: Default source device name for this Device's destination service |
| Stream Destination Name Default | Service; Default destination device name for this Device's source service |
| Stream Source Attributes | Type of service device can deliver (attributes and capability) |
| Stream Destination Attributes | Type of service device can receive (attributes and capability) |

Table 2 includes device summary information such as Manufacturer Name, Manufacturer Logo image name, and can further include a Manufacturer URL for help if there is an available Internet connection to the manufacturers Web site.

Table 2 can further include a user configurable Device Name and Device Location in the home. There can be several variations of the Device Icon representing different states of the device. The Device Icon attribute field includes the name of the current icon. Therefore, the device summary information page can provide immediate device state information to the user by displaying the icon representative of current state.

Each device can include one or more services, e.g. video Stream Source or video Stream Destination. Each source capability has a complementing Default Destination capability and each destination capability has a complementing Default Source capability. This Stream Default Name entry can be used e.g. to automatically default the nearest DTV to be the destination when a DVCR is being controlled as source to eliminate having to select the DTV each time. A background cross-referencing of the Stream Default Name to 1394 address is provided. The video stream services are provided by the 1394 interface itself (not by Web model). As such there is a linkage of the default source or sink to the 1394 address mechanism. The user can access a device and select a name for default, which is then saved on the device. The device's software agent must find the 1394 address and parameters for the 1394 s/w to enable the default stream when required.

Using the Source and Destination service attributes, new server/services can be implemented while maintaining compatibility with existing host or device (nodes) and services. For example, if a new server device providing a new service is developed that is compatible with an existing server device, both the new and existing servers can be added to the attribute list of the new node while maintaining compatibility with existing nodes using the existing server in the network 100. The user can select a compatible device for purchase. These provide a user with "ABOUT" information to check capabilities of existing equipment e.g. prior to purchasing new equipment where compatibility is desired.

Network Operation

A discovery process for every device supporting the 1394WEB standard (e.g. devices capable of displaying a user interface) gathers device information from devices connected to the network 100 to generate the top-level user control page description for the home network, wherein each device is represented by a graphical icon reference and a textual name reference detailed above. The top-level description can include a default page for a presentation engine such as the browser 200, wherein the browser 200 collects the graphic images and names from the devices as it renders the network top-level graphical user interface 220 (GUI) displayed in the browser 200 as shown by example in FIGS. 5-6. The dynamically created top-level HN directory page 220 is made the default page for the browser (first page displayed when the browser is launched).

With reference to FIG. 4*b*, example operation steps include: (1) the browser 200 in device 102 is launched, (2) the browser 200 fetches and presents HN-Directory HTM (Top-Level UI) from the page 204, (3) the browser 200 fetches the HTM files icon.htm and names.htm from pages 202, 204 and presents in the Top-Level UI, (4) the browser 200 fetches any graphics files (e.g., GIF) from pages 202, 204, and presents in Top-Level UI, (5) the browser 200 is then able to present the full HN_Directory page 220 (page 220 is made with hyperlinks to 'INDEX.HTM' files for different devices connected to the network 100), and (6) when a user clicks e.g. DVCR icon in GUI 220 to control the DVCR 110, a corresponding hyperlink in the top-level page 220 to 'INDEX.HTM' of the DVCR 110 is used to retrieve the 'INDEX.HTM' (top control page of DVCR) from page 202 in the DVCR 110, and present the DVCR control page to the user (e.g., if the frame that was clicked (e.g. the icon.htm frame) is not large enough, a graphic is presented in another copy of the browser with full frame size). The user can then command and control the DVCR 110 using the control interface provided by 'INDEX.HTM' of the DVCR device 110 presented by the browser 200 in the DIV 102

The name 'INDEX.HTM' is arbitrary because the ICON.HTM and NAME.HTM are made with hyperlinks to the 'INDEX.HTM'. However, ICON.HTM and LOGO.HTM reference the actual graphics files (e.g. LOGO.GIF and ICON.GIF) in the same devices. In one embodiment, LOGO.HTM can be optional if a logo for a device is optional. The HN_Directory HTML file can have a standard name so that it can be accessed from another device.

Figure 5:
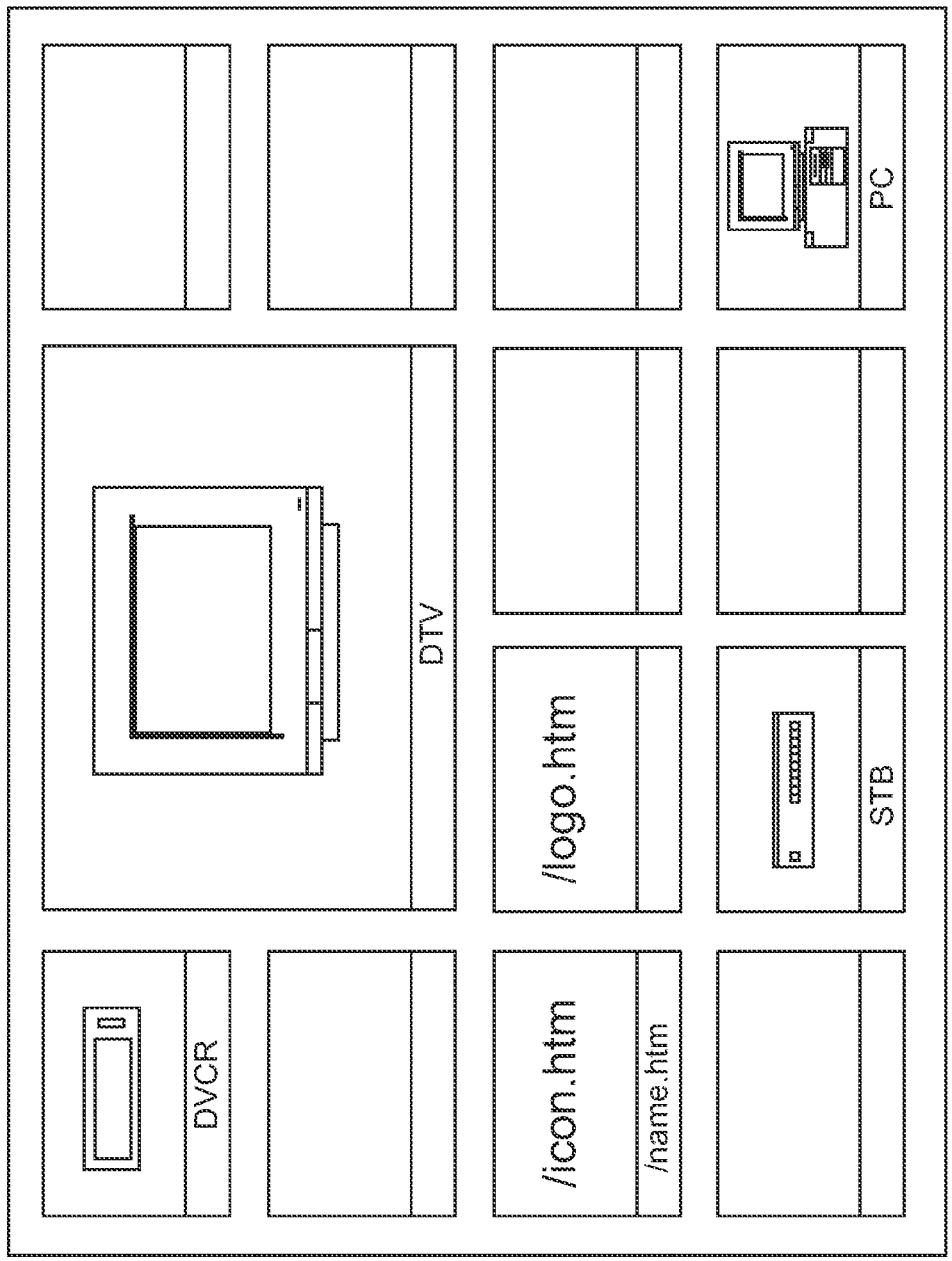
FIGS. 5-6 illustrate example top-level GUIs representing the functions of networked devices to a user.
Figure 6:
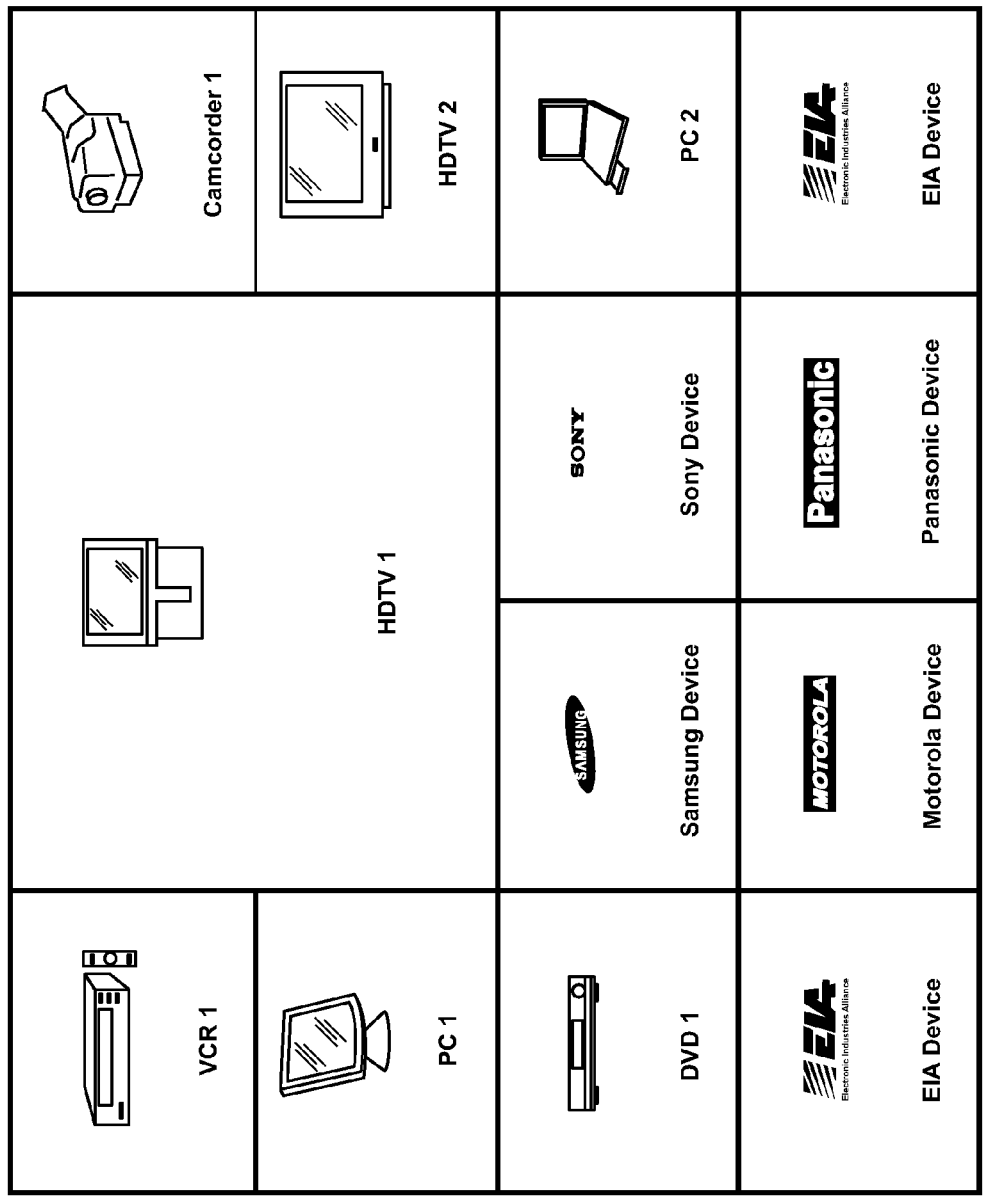

FIGS. 5-6 show that the host device, such as a client device (e.g., DTV 102, HDTV1) or server device (e.g., DVCR 110) that generates and presents the top-level GUI page 220 can assume priority and use a larger size icon for the host device's icon, name, logo, etc. In one version, only devices with servers (services on offer) are displayed in the GUI 220 (a "Client device" comprises device with Client capability, where if it is only client then it is not displayed in the top-level GUI as there is no service to offer). The discovery process reads information from the 1394 address space data storage (configuration ROM structure), as defined in clause 8 of ISO/IEC 13213. Although called 'ROM' it is assumed that the address space is write-able to allow user configuration and modification of user relevant stored values. The contents of the configuration ROM and the discovery process are described further below.

Device naming, addressing and discovery processes for home or local network control of consumer devices using Internet, Web and 1394 technology, can be different from the requirements and practice in the general Internet space. As such according to an aspect of the present invention for in home or local network control of consumer devices, special processes including device discovery, addressing and naming requirements are utilized. For example, the home network must fully function without the presence of external communications and services, without a network administrator, and configuration must be fully automatic. User control can be in many cases entirely keyboard-less. Further, the IEEE1394 protocol is utilized to provide a sophisticated interface including features that can be provide simple, efficient and superior discovery and configuration functions.

1394 Home Network

Figure 7:
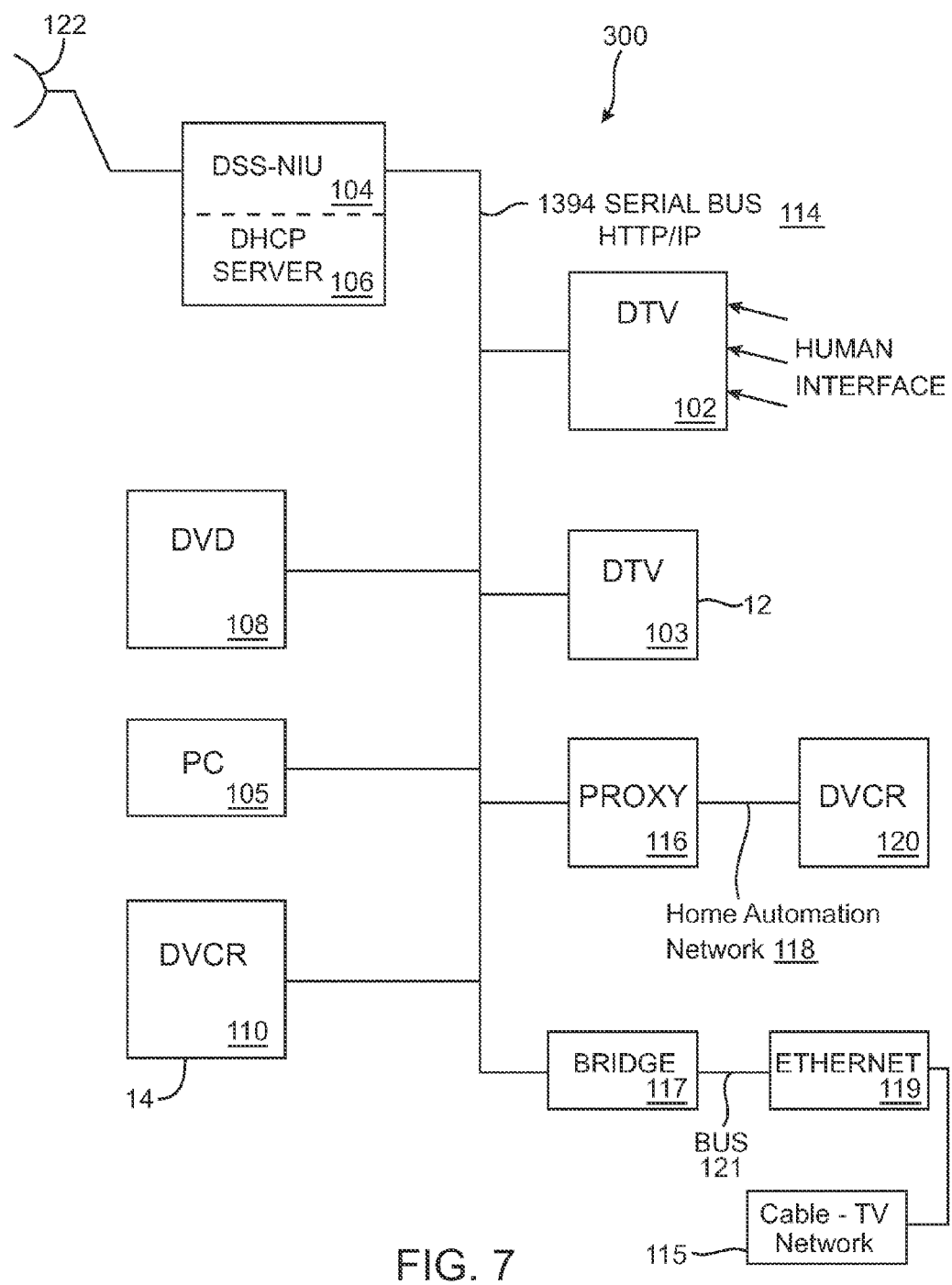
FIG. 7 shows an example block diagram architecture of a home network constructed in accordance with another embodiment of the present invention.

FIG. 7 shows a block diagram of a network 300 constructed in accordance with another embodiment of the present invention. To facilitate understanding, identical reference numerals have been used, where possible, to designate identical elements that are common throughout all the figures herein. As depicted in FIG. 7, a 1394 serial bus 114, described above, electronically connects multiple devices including server devices 14 (e.g., DVD 108, DVCR 110) and client devices 12 (e.g., DTV 102) on the network 100, described above in reference to FIG. 2, wherein the devices communicate using the example layered interface model of FIG. 3 as described above.

The network 300 is not restricted to using a 1394 serial bus, and, in alternative embodiments of the present invention, other bus types, such a Ethernet, ATM wireless, etc., can be used as the physical layer if they meet the particular throughput requirements of an individual network (e.g., a home network). As depicted in FIG. 7, the network 300 includes several devices connected to the 1394 serial bus 114. In this example, the devices include a DBSS 104 for receiving transmission signal from a satellite 122 for subsequent display.

Associated with the DBSS is a network interface unit ("NIU") which, among other things, provides an interface between the DBSS satellite transmission and the 1394 serial bus 114. A digital video device (DVD) 108 is also connected to the exemplary network 300. The DVD 108 can be used to source digitally encoded videos for display on e.g. a digital television. Also connected to the exemplary network 100 is a digital video cassette recorder (DVCR) 110, a digital TV (DTV) 102. In this example, the DTV 102 provides a human interface for the network 300 by employing browser technology to allow users to control and command for devices over the home network 300. A second DTV 103 provides another human interface for the network 100 by employing browser technology to allow users to control and command for devices over the home network 100. The DTVs 102 and 103 can provide human interfaces for the network 300 as each DTV comprises a screen for displaying HTML pages. However other devices having display capability can be used to provide human interfaces. Thus, in certain embodiments of the invention, a device such as a personal computer 105 (PC) is used to provide a human interface for a respective home network, as a PC 105 typically embodies a screen display unit.

The 1394 serial bus 114 is depicted as using the HTTP/IP interface protocol, and preferably HTTP/TCP/IP, wherein IP provides packet format (a one-way write only model), TCP provides an error free version of IP (e.g., ensures packets arrive and in correct order), and HTTP provides 2-way connection (packet to server will expect a response—a 'read' model). Certain devices can require other protocol interface types (e.g., TCP/IP, UPD/IP, FTP/IP, TELNET/IP, SNMP/IP, DNS/IP, SMTP/IP). In certain embodiments of the invention, a proxy 116 can be used to interface two networks using dissimilar interface protocols on their respective mediums which, when connected, comprise the network 300.

For example, as depicted in FIG. 7, the 1394 serial bus 114 using the HTTP/IP interface protocol is connected by a proxy 116 to the Home Automation network 118 (e.g., X10). By using the proxy 116 as HTML/HTTP/CTP/IP/1394 proxy for VCR-Commands/AVC/FCP/1394, to interface between HTML/HTTP/TCP/IP and X10 protocols, DVCR 120 is also accessible on the network 300.

In this embodiment, the network 300 can be connected to an external network 119 of dissimilar type (e.g., Ethernet) to the 1394 Serial bus, via a bus 121. A proxy 117 is used to interface the two dissimilar medium types. For communication between the addressing scheme of the external network 119, and the addressing scheme of the network 300, the bridge 117 comprises a Network Address Translation (NAT) boundary. This technique can be utilized for company LAN's and is a 'divide and conquer' approach to the complex problem of satisfying various network's differing IP address requirements and prevents 'running out of IPV4' addresses. The external network can include e.g. CABLE-TV network 115 via Ethernet to the telephone e.g. ADSL), providing broadband connection to the Internet and WWW. The Ethernet 119 provides the bridge function to the external network. The bridge 117 or Ethernet 119 may provide the NAT address conversion function. If the Ethernet is to provide local private (to home only) addressing (e.g. as defined by then IETF standard RFC 1918) then the NAT function is in the Ethernet 119. Existing cable modems are set up with a global address and also Internet global address for the PC on the Ethernet (in this case the NAT is in the bridge 117).

IP Name/Address Configuration

The aforementioned device naming, addressing and discovery processes for the network 300 are now described. For device naming, point and click Web operation (e.g., using GUI/Web) does not require name services (DNS, Domain Name Service). The Web GUI provides an abstraction layer, and the addresses are hidden as hyper-text links invoked by user 'clicks' to active GUI areas (e.g., buttons). Any change to the devices in the local network 300 causes the top-level discovery GUI page 200 (FIGS. 5-6) to be recreated by the browser 200 (FIG. 4*a-b*) representing the status of the devices in the network 300 at that time and by default presented to the user for immediate use.

For device to device control a different look-up service is utilized for more than names (e.g., service look-up and application look-up). As such, DNS may not provide the necessary features for device to device control. However, a device (e.g., a 1394 connected PC) can access a DNS service as usual. DNS is not required for discovery or operation of devices/services within the home, but DNS (name to address) look-up service is required for external accesses e.g. from a PC. When a name e.g. "www.yahoo.com" is typed in to a Browser then look up take place for the IP address of the Yahoo computer, i.e. 216.32.74.52, because the Internet (even home Internet) operates with addresses.

For a 775WEB UI device which includes an agent for generating the HN top-level directory GUI description and also includes access to the special company web server e.g. homewideweb.com (IP address), can also have the DNS address knowledge. The DNS server computer IP address can be any IP address under the control of the manufacturer. Effectively the DNS address is built-in to the device (or can be updated if the agent is made to be update-able and is later updated).

For device addressing, in one embodiment of the invention, utilizing fixed IP addresses from a large address space can afford the simplest and most reliable network configuration, and the readily accessible ROM data space in the 1394 interface allows utilization of fixed IP addresses therein. In another embodiment of the invention, non-fixed IP (dynamic) addresses can be utilized, wherein an abstraction layer (e.g., name or look-up mechanism) is employed to retain pre-organized communications For IP address configuration, the following protocols can be utilized: (1) Dynamic Host Configuration Protocol (DHCP) with DHCP servers and DHCP clients, (2) DHCP clients resort to auto-configuration (DHCP server not present), and (3) preferably, FWHCP (Fire-Wire Host Configuration Protocol) server agent(s) and FWHCP clients, described further below. The auto-configuration in (2) above is that proposed as an IETF Draft "draft-ieff-dhc-ipv4-auto-config-04.txt".

DHCP requires support of the BOOTP/UDP protocol, and replicates what is done within the 1394 specification and provides features such as lease time and dynamic addressing. Typical DHCP requires management by an administrator and must be configured and adapted to the network requirements of mass manufactured consumer electronics (CE) appliances where, for example, multiple identical CE appliances with DHCP server built-ins must be considered.

The 1394 technology provides 'Plug-in' or 'Power-up' reset and following 'Self-ID' sequences, well suited for network configuration. Further, the 1394 specification provides a built-in 'ROM' address space well suited for storage of, and access to, configuration data (e.g., IP addresses). As such, in a preferred embodiment of the invention, an IP address configuration agent (FWHCP) and discovery page for user control of 1394 devices are utilized. FWHCP provides IP address configuration for 1394WEB and 1394 devices. The purpose and result of FWHCP is similar to DHCP (i.e., a server to identify and assign the local IP addresses), but in operation FWHCP uses data in 1394-address space and 1394 commands. FWHCP provides IP address configuration of 1394WEB devices on the 1394 network avoiding collisions with devices on adjacent attached networks other than 1394. Devices are manufactured with a built-in IP address from the 10.x.x.x range. In the unlikely event of a collision, FWHCP sets a new IP address and saves it in the device.

DHCP/Auto-configuration can be utilized for devices on networks other than 1394. DHCP protocol provides client "requested IP address". Preferably, the requested IP address space is selected from the upper part of the 24 bit RFC1918 range (10.128.1.1 to 10.254.254.254). By choosing part of the allowed private address range for 1394 IP addresses and another part for other configuration methods (e.g., DHCP and DHCP/Auto-Configuration) then compatible and non-interfering addresses are generated for a heterogeneous network and allow FWHCP and DHCP to coexist.

While choice of non-overlapping IP addresses for 1394 and adjacent networks is desirable, the heterogeneous network using FWHCP will configure successfully even if they do overlap. Also, DHCP clients check their assigned IP address with a test ARP message before using it. As such, different address configuration methods can coexist successfully.

Network Scenarios and Address Management

Figure 8:
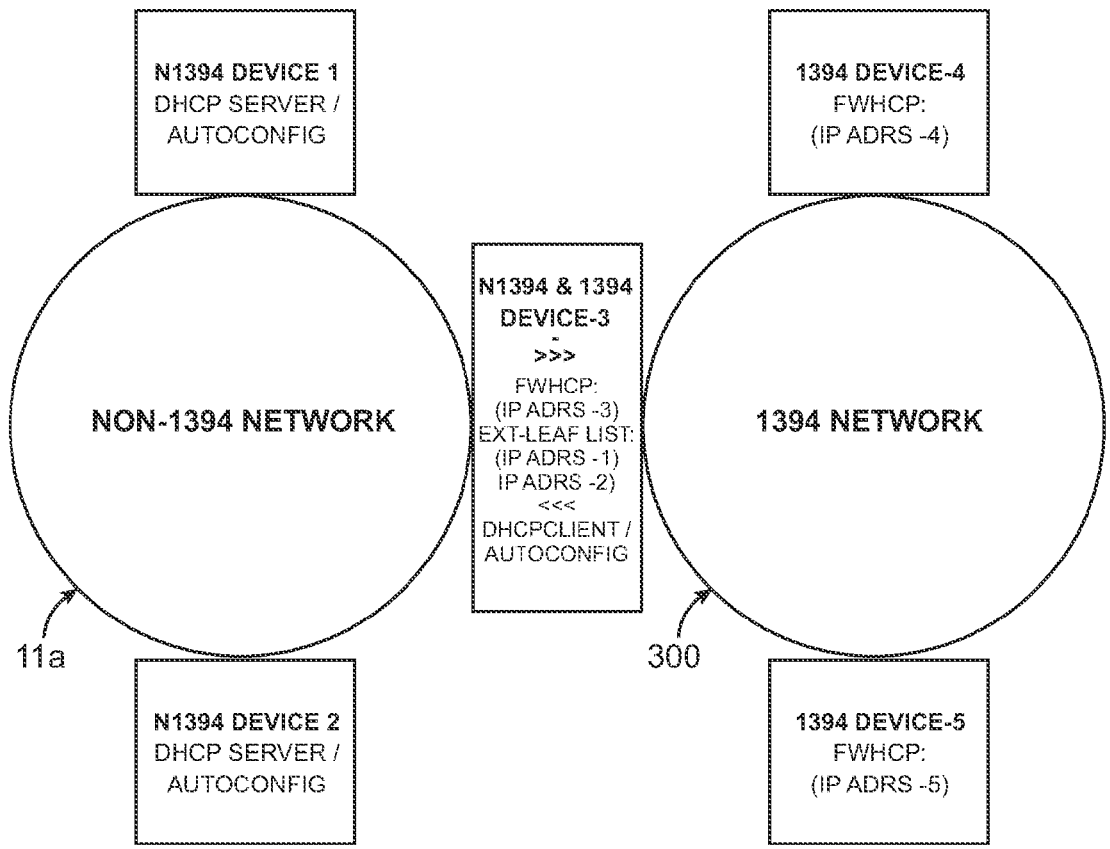
FIG. 8 shows an example process according to the present invention for communication between a 1394 network and a non-1394 network for IP address configuration.

Referring to FIG. 8, an example process according to the present invention for communication between a 1394 network (e.g., network 300) and a non-1394 network (e.g., Ethernet 119) for IP address configuration is described. In this case the 1394 network 300 utilizes FWHCP configuration and the non-1394 network 119 utilizes DHCP configuration or other method. Generally, 1394 devices (such as DTV and DVCR in FIG. 7) do not support DHCP. The 1394 DEVICE-3, for 1394 network to non-1394 network communication, includes an IP address in the 1394 ROM space and provides support for FWHCP for a 1394 device. The DEVICE-3 further includes means for supporting the configuration mechanisms on the non-1394 network, and maintains an extension data leaf in the 1394 ROM space for IP addresses of devices on the non-1394 network. As such, configuration processes (e.g., FWHCP for top-level UI description generation) on the 1394 network 300 can include use of IP addresses on the non-1394 network by selecting IP addresses from the extension data leaf. The non-1394 network configuration operates to provide the IP addresses for the 1394 extension data leaf.

According to the discovery process (agent), 1394 specification 'plug-in' reset and self-ID is utilized for configuration and can be used for IP address configuration. Preferably, fixed IP addressing is utilized for home networks, however dynamic IP addressing can also be utilized. DNS is not required within 1394WEB control because a top-level GUI description is created with hypertext-links that use IP addresses rather than names. Preferably, the IP configuration agent (FWHCP) for the 1394 network is utilized for IP configuration using 1394 ROM data and 1394 commands, however DHCP can also be utilized. FWHCP utilizes lower half of RFC1918 10.LH.X.X addresses and other home networks (not 1394) use upper half 10.UH.X.X. Preferably, the FWHCP server agent is built-in to any device that can be a client (control initiator). Where there are several client devices connected to the 1394 network, only the client device with the highest Global Unique Identification (GUID) operates. GUID comprises a number built-in to the interface. If there are multiple FWHCP agents available on the 1394WEB network then there is an initial self-election process to determine the one that will operate and all others remain quiet. The highest GUID will operate. In other versions, highest bit-reversed-GUID can be used.

A device interfacing to a non-1394 network supports a ROM extension leaf of IP addresses on the non-1394 network. This allows inclusion of the IP addresses on the non-1394 network in the 1394 top-level GUIs (e.g., FIG. 4a-b, GUIs 202, 204). Control data bits in the 1394 ROM space are used to control the operation of three configuration agents: (1) 1394 Self_ID count, (2) IP configuration FWHCP, and (3) UI description generation described further below.

Initially 1394 Self-ID count discovers the existence of devices. After a bus reset (caused by power up/down or device attachment/detachment) 1394 software in the device observes the automatic configuration process (1394 self-ID cycles) for the purpose of counting the number devices. This is a normal part of 1394 software for any 1394 device. Then, IP Configuration FWHCP (the one self-elected FWHCP) probes the discovered devices and checks their built-in IP address. Discovered duplicate (colliding) IP addresses are disabled and a new address is assigned to the device. Then, UI description generation agent (UI or other devices), reads all 1394WEB device IP addresses and generates a top-level device directory Graphic User Interface file in HTML of top-level icon pages from each device later rendered by a Web browser for User discovery of devices for control.

Figure 9A:
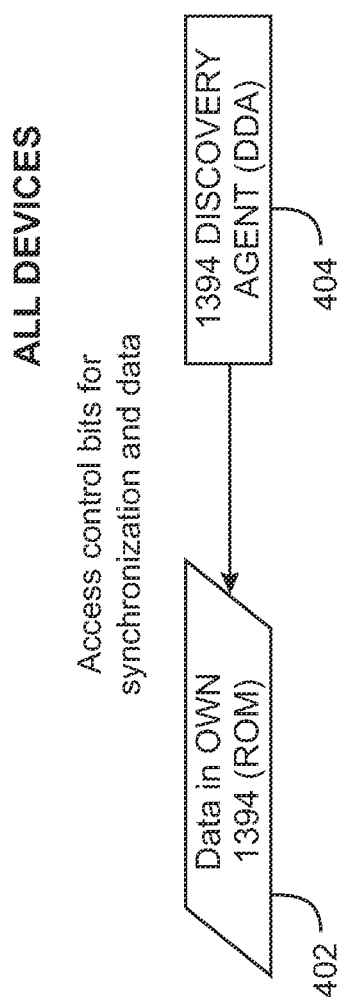
FIG. 9a-c show example functional block diagrams of connections to data and control bits of an embodiment of a discovery system architecture in a network according to another aspect of the present invention.
Figure 9B:
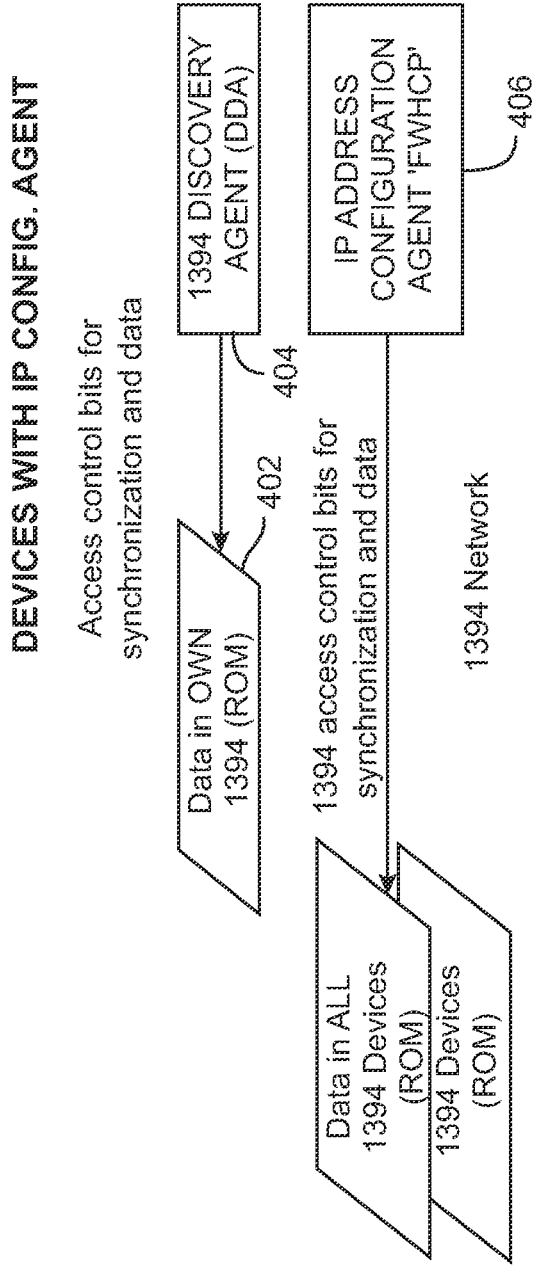
Figure 9C:
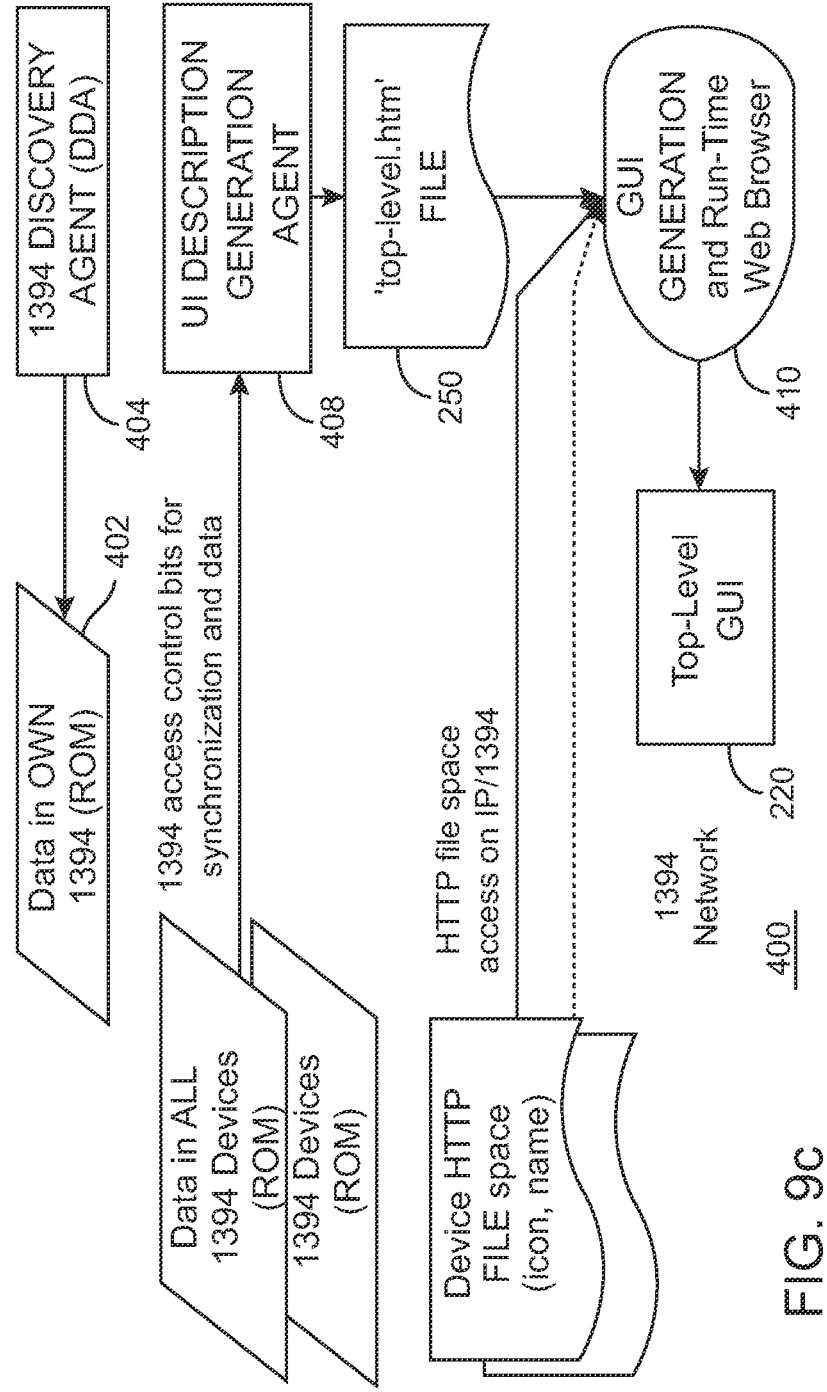

According to the present invention each device in the 1394 network 400 can generate its own top-level network UI description 250 (FIG. 9c). The UI description 250 is used by a presentation engine such as the browser 200 in a client device to generate and display a top level directory page such as page 220 in FIGS. 5-6. After the 1394 Self-ID agent has enumerated all devices connected to the 1394 network 300, the top-level UI description 250 is generated separately by all UI devices (and non-UI devices as desired). A device (e.g., DTV) can select a more prominent (e.g., larger) icon to represent that device, and make the entire GUI 220 with a different look. This technique provides substantially more reliable operation than a centrally generated GUI for operation of all device, because each device can generate its own UI description 250 and display a GUI (e.g., top level page 220) based thereon without dependence on another device. In each UI description 250, device icon and logo image files of the devices currently connected to the network 300 are referenced by icon and logo HTML 'pages' and name text wrapped in an HTML page (ICON.'Graphic' referenced ICON.HTM is in pages 202 and 204 which also include the control pages for the device; FIG. 5 below also shows the ICON.HTM, LOGO.HTM and NAME.HTM in a top-level directory page). HTML frames are used to create the top-level directory UI description 250 for network devices in each network device as desired.

As such, advantageously, a useful layer of abstraction is provided to allow use of alternative file names and types for e.g. identification graphics in the network devices without need for change in the top-level description 250 generated in each device. The name text is also placed in an HTML description 202, 204 (NAME.HTM is in pages 202, 204), allowing a user to configure the name text at a device e.g. DTV to change to e.g., DTV-BED2 through one of the device GUI pages 220. As such, the page 220 is displayed as the Browser is launched after a reset. The user sees and clicks DVCR ICON graphic, whereby DVCR top level control GUI 202 is fetched (with 'Play' button etc.). User clicks one of the buttons e.g. "Configure Device NAME" which is another GUI (of hierarchy of control pages for DVCR) with a large selection of different names. User clicks one name out of the lists of names provided e.g. "Master Bedroom DVCR". Software on the device changes the file names so that the file named NAME.HTM contains the text "Master Bedroom DVCR" (the old default NAME.HTM file that contained DVCR is changed to some other name).

Appearance of the GUI 220 is more stable in the event of 'bad citizen' devices having too much or oversized text or oversized logos. In this case the frames isolate the problem and prevent the bad items from adversely affecting the appearance of the entire top-level GUI 220.

Device Discovery Architecture

Figure 10:
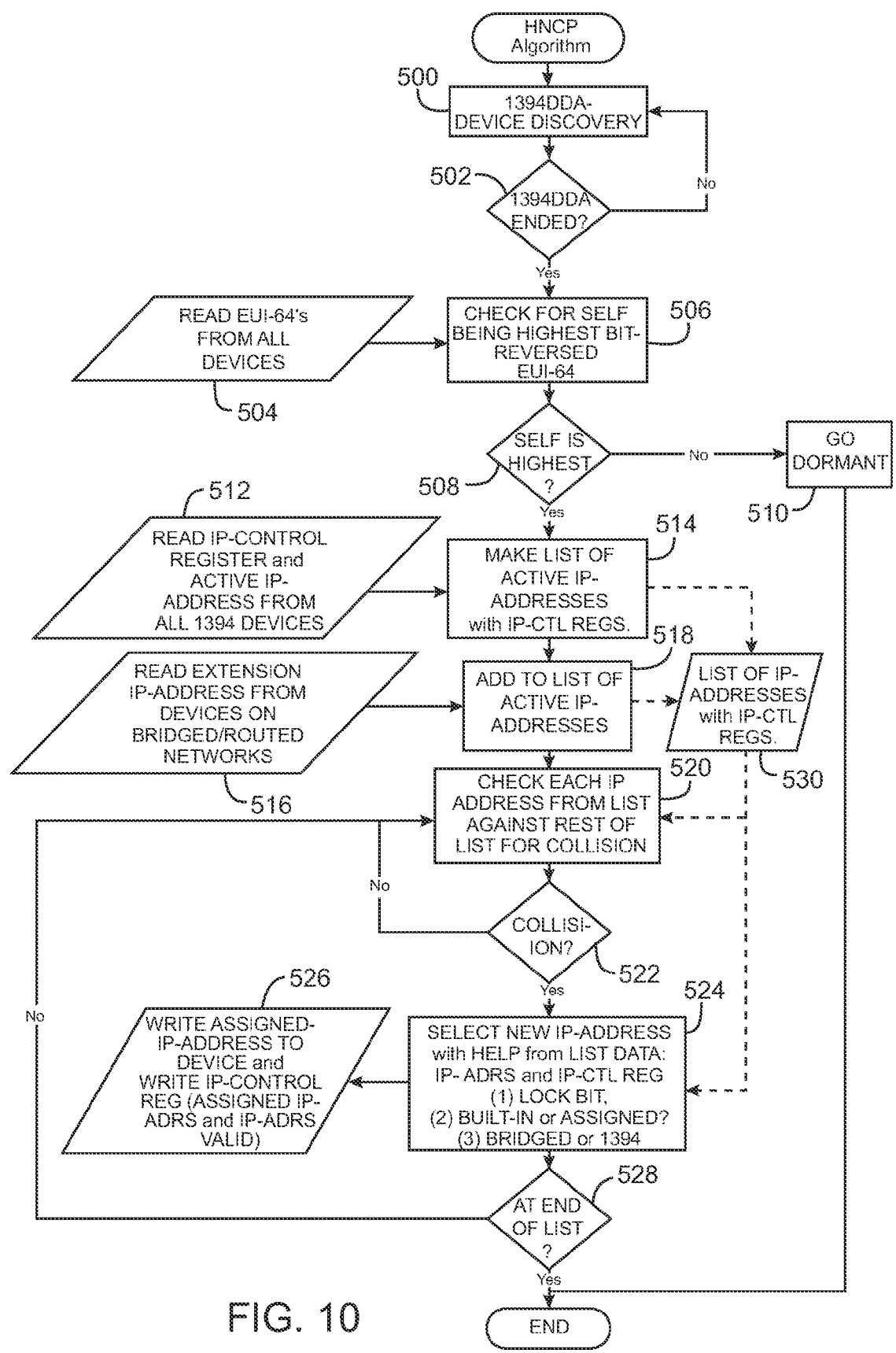
FIG. 10 shows an example flow diagram for discovery and configuration agents in the home network in connection with the functional block diagrams in FIG. 9a-c.

Referring to FIGS. 9*a-c*, 10, 11 example functional blocks and connections to data and control bits and flowchart of an embodiment of a system architecture 400 for the aforementioned discovery process are shown. The system 400 comprises five primary elements: (1)1394 non-volatile memory space (IEEE1212R ROM) 402 for configuration data and control data bit storage; (2)1394 Device Discovery Agent (1394DDA) 404; (3) IP Address Configuration Agent (FWHCP) 406; (4) UI Description Generation Agent 408; and (5) GUI Generation and run-time environment 410 (e.g., Web Browser 200 in FIG. 2). Further, FIG. 10 shows an example flow diagram for the DDA and FWHCP agents in system 400 operating in connection with the functional blocks in FIG. 9*a-c*. And, FIG. 10 shows an example flow diagram for the UIDGA agent in system 400 operating in connection with the functional blocks in FIG. 9*a-c*.

Referring to FIGS. 9*a* and 10 all devices include the 1394 device discovery agent (1394DDA) 404 to enumerate the devices on the 1394 bus, after a reset, and to write the value into the local 1394 ROM space 402 for communicating the value to other functional agents (steps 500, 502). For synchronizing (inhibiting) commencement of other configuration agents, the 1394DDA agent 404 also sets the 'configuration operating' control bits. The discovery agent/mechanism can use means, other than the ROM space, to communicate information between the configuration agents that are local to one device and where the information does not need to be seen by other devices.

1394 ROM Data in all Devices

All devices in the network 300 include the following information relevant to the discovery and IP address agents 404 and 406, respectively, for the 1394WEB in the 1394 configuration ROM 402: (1) Built-in 64 bit GUID (Global Unique ID, in 1394 specification); (2) Built-in IP address from the RFC 1918 private address space in the range '10.1.1.1' to '10.127.254.254'. Manufacturers can select a value from the GUID such that chance of collision is minimized. The upper portion of the private address space (i.e., 10.128.1.1 to 10.254.254.254) is reserved for devices on bridged networks; (3) Assigned IP address in the range '10.1.1.1' to '10.127.254.254' (assigned by operating FWHCP agent 406); (4) IP address extension leaf for IP devices on bridged networks; (5) Assigned Count of 1394 devices (assigned by 1394DDA agent 404); (6) Control/status bits to indicate Configuration-in-Progress Synchronization control for 1394 Device Discovery Agent 404, and to indicate IP-Address configuration (The control bits indicate the configuration is in progress and therefore the values, in ROM data other than the control bits, for 1394DDA and IP address are not checked or not written and therefore should not be used). The bits further indicate which IP address is valid (assigned or built-in), and whether an FWHCP server agent 406 is present in the device; (7) HTTP web server to allow files in the device's file space to be accessed remotely; and (8) device information 202, 204 including actual 'icon', 'name' and 'logo'HTML files and other referenced graphic files accessible through the Web Server. The above summarized information is detailed in the 1394 ROM space description below.

IEEE 1212 Configuration ROM

The content of the general 1394ROM structure 402 is specified in IEEE1212r, IEEE1212 and IEC61883. The ROM structure 402 is a hierarchy of information blocks, wherein the blocks higher in the hierarchy point to the blocks beneath them. The location of the initial blocks is fixed while other entries are vendor dependent, but can be specified by entries within the higher blocks.

Table 3 shows the Bus_Info_Block and Root_Directory of the configuration ROM 402. The first byte of each entry is known as a key and identifies the type of entry. The following can be implemented in the configuration ROM of all devices making use of the EIA-775 specifications, including display devices such as DTVs and source devices such as DVCRs, STBs, etc. There may be several other structures required based on other protocols to which each device conforms. Table 3 includes information for a device which also complies with the IEC61883 protocol. The Root_directory contains pointers to a Model_Directory and three Unit_Directory entries (IEC61883, EIA-775 and 1394WEB), to indicate that the device supports EIA-775 as well as 1394WEB protocols. The Root directory entries are useful to other 1394 devices to discover the protocols and software (also called services) supported by this 1394 device.

TABLE 3

| Configuration ROM | | | | |
|---|---|---|---|---|
| Offset (Base address FFFF F000 0000) | | | | |
| Bus_info_block | | | | |
| Offset | | | | |
| $04\,00_{16}$ | 04 | crc_length | rom_crc_value | |
| $04\,04_{16}$ | "1394" | | | |
| $04\,08_{16}$ | flags | reserved | cyc_clk_acc | max_rec reserved |
| $04\,0C_{16}$ | node_vendor_id | | chip_id_hi | |
| $04\,10_{16}$ | chip_id_lo | | | |

Wherein, $04\,0C_{16}$ and $04\,10_{16}$ are also known as the 64 bit GUID or Global Unique ID.

| Root_directory | | |
|---|---|---|
| Offset | root_length | CRC |
| $04\,14_{16}$ | $03_{16}$ | model_vendor_id |
| | $81_{16}$ | vendor_name_textual_descriptor_offset |
| | $0C_{16}$ | node_capabilities |
| | $8D_{16}$ | node_unique_id offset |
| | $D1_{16}$ | Unit_Directory offset (IEC 61883) |
| | $D1_{16}$ | Unit_Directory offset (EIA-775) |
| | $D1_{16}$ | Unit_Directory offset (1394WEB) |
| | Optional | |
| $xx\,xx_{16}$ | $C3_{16}$ | Model_Directory offset |

The IEC_61883 unit directory is shown in Table 4. This directory is referenced by the Unit_Directory offset, in the Root Directory (i.e., Table 3.). In the Unit_SW_Version field, the least significant bit specifies AV/C (0) as specified in IEC 61883.

TABLE 4

IEC_61883 Unit Directory
Unit_Directory (IEC_61883)

| directory length | CRC |
|---|---|
| $12_{16}$ | Unit_Spec_ID (1394TA = 00 A0 $2D_{16}$) |
| $13_{16}$ | Unit_SW_Version (first pass key = $01_{16}$) |
| ... | <<possibly other fields>> |
| ... | ... |

The EIA-775 Unit Directory is shown in Table 5. The following EIA-775 specific information appears in the EIA-775 Unit Directory.

TABLE 5

EIA-775 Unit Directory

| directory length | CRC |
|---|---|
| $12_{16}$ | Unit_specification_ID (EIA-775 = $005068_{16}$) |
| $13_{16}$ | Unit_software_version ($010100_{16}$) |
| ... | <<possibly other fields>> |
| ... | ... |

The Unit_specification_ID specifies the identity of the organization responsible for the architectural interface of the device and the specification. In this example case, the directory and identity value=$005068_{16}$ refers to the EIA as the responsible body and the EIA-775 control architecture specification.

The Unit_software_version designates EIA-775 revision level supported by the device. The format is shown in Table 6.

TABLE 6

Unit_software_version coding

| First octet | $01_{16}$ |
|---|---|
| Second octet | Major Version Number (currently $01_{16}$) |
| Third octet | Minor Version Number (currently $00_{16}$) |

The 1394WEB Unit Directory is shown in Table 7. The following 1394WEB specific information appears in the 1394WEB Unit Directory.

TABLE 7

1394WEB Unit Directory

| directory length | CRC |
|---|---|
| $12_{16}$ | Unit_specification_ID (1394WEB = $00XXXX_{16}$) |
| $13_{16}$ | Unit_software_version ($010100_{16}$) |
| $38_{16}$ | Discovery_control_bits |
| $39_{16}$ | Assigned_Count_of_1394_devices |
| $3A_{16}$ | IP_Address_Built_in |
| $3B_{16}$ | IP_Address_Assigned |
|  | IP_Address_Extension Leaf |
| —$_{16}$ | <<possibly other fields>> |

The Unit_specification_ID specifies the identity of the organization responsible for the architectural interface of the unit and the specification. In this example case the directory and identity value=$00XXXX_{16}$ refers to the responsible body and the 1394WEB control architecture specification.

The Unit_software_version designates the 1394WEB revision level supported by the device. The format is shown in Table 8.

TABLE 8

Unit_software_version coding

| First octet | $01_{16}$ |
|---|---|
| Second octet | Major Version Number (currently $01_{16}$) |
| Third octet | Minor Version Number (currently $00_{16}$) |

Discovery_control_bits ($38_{16}$).

Key value ($38_{16}$) permitted by the IEEE1212R specification section 8.8 for the private use by the owner of the directory and architecture is used for the Discovery_control_bits immediate value.

TABLE 9

Discovery_control_bits

| X | | | FWHCP Server Agent Yes = 1 | Configuration operating. Do not use (if True) 1394 Dev. Count | IP-Address | Which IP address? Assignd_1Built-in_0 |
|---|---|---|---|---|---|---|
| 31 | 6 | 5 4 | 3 | 2 | 1 | 0 (LSB) |

These are control bits in 1394 ROM space 402 accessible by local and remote device. The control bits are used by the IP address configuration agent 406 and the User interface description generation agent 408 as described further below.

In one embodiment of the invention, said control bits provide the following information:

Bit 0—Which IP address—Indicates which IP address is used or is in-use i.e., the Built-In address (=FALSE) or Assigned Address (=TRUE). This is set by the operating IP configuration agent FWHCP 406.

Bits 1, 2—Configuration Operating Do not use—When set indicate that the 1394 device discovery and also, seperately, the IP configuration agents 404 and 406, respectively, are operating and therefore the values referred to are invalid as they can change or are not yet written. These bits are set by the local (device) 1394DDA agent 404. The 1394DDA agent 404 clears the 1394 Dev. Count bit and the operating FWHCP agent 406 clears the IP-address bit.

Bit 3—Presence of FWHCP Server Agent 406—is set if the device has an operable FWHCP agent 406. This bit and GUID are used by the FWHCP agents 406 to determine which FWHCP agent 406 will operate.

Assigned_Count_of_1394_devices ($39_{16}$)—Assigned immediate value of the count of 1394 devices in the network 300. The count is made as the 1394 interface goes though its self-ID cycles. The 1394 device discovery agent 404 generates the value, which is saved in ROM space 403 for subsequent use by the IP and UI configuration agents 406 and 408, respectively.

IP_Address_Built_In ($3A_{16}$)—Assigned Immediate Value. This address is assigned at manufacture time and built-in to the device. If this Built-in address cannot be used, an alternative address can be saved in the Assigned address space and the control bit set to indicate such.

IP_Address_Assigned ($3B_{16}$)—Assigned Immediate Value. If identical IP addresses are detected, the IP address configuration agent FWHCP 406 assigns this address to prevent collision. Further, the control bit is set to indicate such.

IP_Address_Extension Leaf_for_attached_network ($BC_{16}$)—This directory entry is for the address offset to the data leaf for the IP address extension table, see Table 10. The data leaf contains IP addresses for devices on connected non-1394 networks (but also could be bridged 1394 networks). The table is included in communications devices of types (e.g., bridge) that connect through to foreign (non-1394) networks. The table can be expanded to include as many IP addresses as required. The address of the communications device itself should not be included in the table.

TABLE 10

IP_Address_Extension Leaf

| Leaf Length-1(n)$_{16}$ | CRC-16$_{16}$ |
|---|---|
| IP Address 1 | |
| ... | |
| IP Address n | |

In regards to Control word for Discovery Control Bits, use of a ROM entry for the actual Discovery Control Bits word as defined herein works but is an example implementation. As ROM is not designed to be written efficiently (i.e., ROM areas have to be erased and writing them is slow relative to other hardware e.g. register). Registers are provided in the 1394 hardware for data that must be written to frequently. In another version, a 1394 Register can be used for the 'Discovery_control_bits' control word. Registers are in a space also addressable by other devices, whereby another device can look up in the ROM the address of the Register and then write to that Register.

Referring FIG. 9b, one or more devices include an IP address configuration agent (FWHCP) 406 (e.g., all UI devices and Gateway devices and any other device that can be a Control initiator). The FWHCP configuration agent 406 accesses all devices' IP address values in data in the 1394 ROM 402 across the 1394 network 300. For synchronization commencement and completion of commencement of other applications (e.g., the UI description generation), the FWHCP agent 406 also accesses the 'configuration operating' control bits.

Referring to FIG. 9c, devices capable of displaying user interfaces, and also some other devices (e.g., Gateway devices), can include the UI description generation agent 408 for generating the top-level UI description 250 in e.g. HTML. Because as detailed above only one IP configuration agent 406 operates per network 300, not all devices need to include the IP configuration agent 406, though all devices can include an IP configuration agent 406. If a device has the operating IP Configuration Agent 406 and is a User Interface Device then the IP configuration agent should operate before the UI Description Generation agent. The UI description generation agent (UIDGA) 408 utilizes information including control bits defined in the 1394 ROM space 402 and other information (e.g., for determining which FWHCP operates is the Global Unique ID (GUID) of Bus_Info_Block of Table 3) for determining which IP configuration agent 406 (if multiple in the network) operates, synchronizing commencement and for access to the in-use IP addresses. Any device may have and operate a UIDGA for making the HN_Directory page (top-level discovery page). After the IP addresses are configured UIDGA reads the addresses to make the HN_Directory page. In each client device, when UI description generation is complete, the GUI generation and run-time environment 410 (e.g., Web Browser 200 in FIG. 2) uses the UI description HTML file 250 to access all devices' HTTP file space for icons, names and logos (Icon.HTM, Name.HTM and Logo.HTM are contained in pages 204, and 204) to generate the full top-level GUI 220 for display in that client device.

Web Browser uses HTML file 250 to render the actual GUI graphics, in the process accessing files from the devices e.g. Icon.HTM, Name.HTM and Logo.HTM and in turn accessing any additional files these files reference e.g. ICON.GIF and LOGO.GIF.

1394 Device Discovery Agent (1394DDA)

Referring to FIG. 9a-c, 10 as discussed, each 1394WEB device in the network 300 can include the device discovery agent 404. The device discovery agent 404 enumerates the 1394 devices in 1394 address space connected to the 1394 bus, wherein the raw discovery is performed in 1394 hardware. The Self_ID and Physical Node Number Assignment and the steps leading to it is the basic discovery process performed by the interface hardware/firmware. All devices monitor the Self_ID cycles and make a note of the existence of 1394 devices. This is a part of 1394 software for any 1394 device: (1) Reset—Bus reset propagates to all interfaces, on device power-up, device attachment and device detachment, (2) Tree Identification—Transforms a simple net topology into a tree, to establish a ROOT which is master for certain functions: Bus Cycle Master, Highest priority in arbitration for bus time, (3) Self Identification—Assigns Physical Node number (address) and also exchange speed capabilities with neighbors. Highest numbered node with both Contender Bit and Link-on Bit is Isochronous Resource Manager.

The discovery agent 404 writes the final count value of the devices to the 1394 ROM space to communicate it to other agents. The device discovery agent 404 is the first software agent to execute after a 1394 reset cycle, and control bits (Discovery Control Bits 2 and 1, Configuration Operating: 1394DDA, and IP_Address) are used to delay other agents, including the configuration agents 406 and 408, from execution until the discovery agent 404 has finished execution.

In one embodiment, the 1394DDA agent 404 in each device performs the steps 500, 502 including: (1) setting synchronization control bits (i.e., '1394DDA in progress' and 'IP configuration in progress' bits) in the device's own 1394 ROM space 402 to indicate that the 1394DDA in progress and IP configuration is in progress (IP configuration will not be in progress if 1394 DDA is executing) and that the values of 1394 device count and IP address are not valid, whereby said control bits inhibit other agents (e.g., 408) from operating prematurely; as such the 1394 DDA executes, then an elected FWHCP executes, and then (usually for UI device) UIDGA executes; (2) counting the number of 1394 self-identity sequences after a 1394 Reset to discover the number of devices and effectively their local node addresses for use by the other agents 406, 408; (3) writing the device count value to the device's own 1394 ROM space 402; and (4) clearing (e.g., to false) the synchronization control bit for '1394DDA in progress' in the device's own 1394 ROM 402, wherein the 'IP configuration in progress' bit remains set and is cleared later by the operating FWHCP agent 406.

Alternative Architecture for Configuration with IP Address list in network communication (bridge) device is possible. For example, the IP address list of IP addresses of devices on a bridged (e.g., non-1394 network) can alternatively be examined at the IP configuration stage by the FWHCP agent 406 rather than only at the UIDGA stage by the UIDGA agent 408. This allows the FWHCP agent 406 to detect and correct address collisions and therefore allow operation without having two separately defined address ranges, one for the 1394 network 300 and one for the non-1394 network 119. Correction of address collision can be accomplished by modifying the address of a colliding 1394 device as the bridged network IP address list cannot be modified by the aforementioned agents 406, 408 for the 1394 network 300. Configuration is more reliable if the FWHCP agent 406 can check the addresses in the bridged network 119 for collision prior to allowing the addresses used on the 1394 network 300.

IP Address Configuration Agent (FWHCP Agent)

Referring to FIG. 9*a-c*, 10 the IP Address Configuration software agent (FWHCP) 406, operates to provide 'Fixed' IP address management and to detect and correct IP address clashes in the mass manufactured 1394 devices. All 1394WEB UI devices include, and other devices can include, an FWHCP agent 406. Only one FWHCP agent 406 operates in the network however. The 1394DDA 404 agent is the first software agent to execute after a 1394 reset cycle, and as aforementioned the 1394DDA 404 agent sets the '1394DDA in progress' and 'IP configuration in progress' bits to delay the FWHCP agent 406 until the 1394DDA agent 404 has executed to completion.

In one embodiment, the IP Address configuration agent 406 in a device performs steps including polling the 1394DDA configuration operation control bit (i.e., the '1394DDA in progress' bit) to determine if the 1394DDA configuration software agent 404 has executed to completion. If so, then the FWHCP agent 406 uses the count of devices determined by the 1394 DDA agent 404, and reads GUID's and Control Words from every device (step 504) to determine which device in the network 300 is selected to execute its FWHCP agent 406 (step 506). The selected device is one with an FWHCP agent 406 that finds it has the highest GUID (step 508). All other FWHCP agents 406 in other devices remain dormant (step 510). The operating FWHCP agent 406 reads the 'in-use' (active) IP address (determined by Discovery_control_bits BIT 0) from each local node (e.g. units present on the interface, host) and listed (step 512). In one version, the software agent makes a list for saving the IP addresses to an 'Array' as they are read (steps 514-518). The list will be in memory (RAM or DRAM) under the control of the compiler and OS. In-use status is determined by a bit setting in the device, which indicates whether the built-in or assigned address is in-use. In Table 7 the IP_address_assigned and IP_address_built_in are in the 1394Web Unit Directory.

The operating FWHCP agent 406 examines said list for collision among IP addresses listed therein (other collision detection and resolution methods can also be used) (steps 520-522). If a collision is detected, the FWHCP agent alters the colliding addresses by e.g. substituting the least significant 6 bits of IP address for their 6 bit node address (step 524). Only the minimum number of alterations are performed to relieve the collision. If one of the colliding addresses is already an assigned address, then that address is altered in preference to the colliding built-in address by e.g. incrementing the 6 bit substitute value and re-checking until the collision is resolved. The FWHCP agent 406 writes the altered value back to the device and the control bit (Discovery_Control_Bits: Bit 0) is set to indicate that the assigned IP address is in-use, and the built-in default is no longer in-use (step 526). The process is repeated for each IP address (step 528). After the collision resolution process, the operating FWHCP agent 406 accesses each device in turn and sets the 'IP configuration in-progress' bits in each device to e.g. 'false' to indicate that the indicated IP address is valid, UI Description Generation Agent In conventional WWW operation, users access the same top level page. Referring to FIGS. 4*b*, 7 and 9-11, according to an aspect of the present invention however, all UI devices (e.g., devices capable of displaying user interfaces) include an UI description generation agent (UIDGA) 408 to independently generate a top-level UI page 220 for control of the devices on the local network (e.g., network 100, network 300, etc.) by users. In one example, a client device (e.g., PC) dynamically generates a locally saved default page 220 for user control of devices connected to the network 100. This allows each UI device (e.g., DTV 102) to generate a different view 220 of the home network e.g. with a larger more prominent icon for that UI's devices displayed. As such, the user is readily made aware of which UI device is 'right here' (in front of the user) or in the case of access external to the home, no device is 'right here'. A device without a UI can generate a UI for another device but is unaware of type of device (e.g., Cable Modem generates UI of HN devices for user external to the home). In this case the actual UI device is unknown. Therefore no particular device is prominent in the GUI. Further, manufacturers of devices connected to the network 100 can provide their own GUI design 202, 204 in each device as desired. In addition later, improved Browser and Web technology designs need not be hampered by existing technology.

Non-UI devices, particularly those devices performing a gateway function, can also include a UI Description Generation agent 408 to generate top-level GUI descriptions 250, without including GUI Generation and Run-Time processes 410 (e.g., Web Browser 200) to generate and display GUIs 220. With appropriate address use (e.g., using the RFC1918 private addresses on the local HN), this allows external WWW access to the 1394WEB network devices. External addresses are assigned 'real' IP addresses suitable for Internet use. Generally there is a unit (e.g., gateway type unit) with the UIDGA 408 which represents the home to the outside Internet. The gateway's UIDGA generates a different UI description for the outside use (remote access case different from inside local device use), using the home's IP address with extended links to identify which home device local private IP address.

Figure 11:
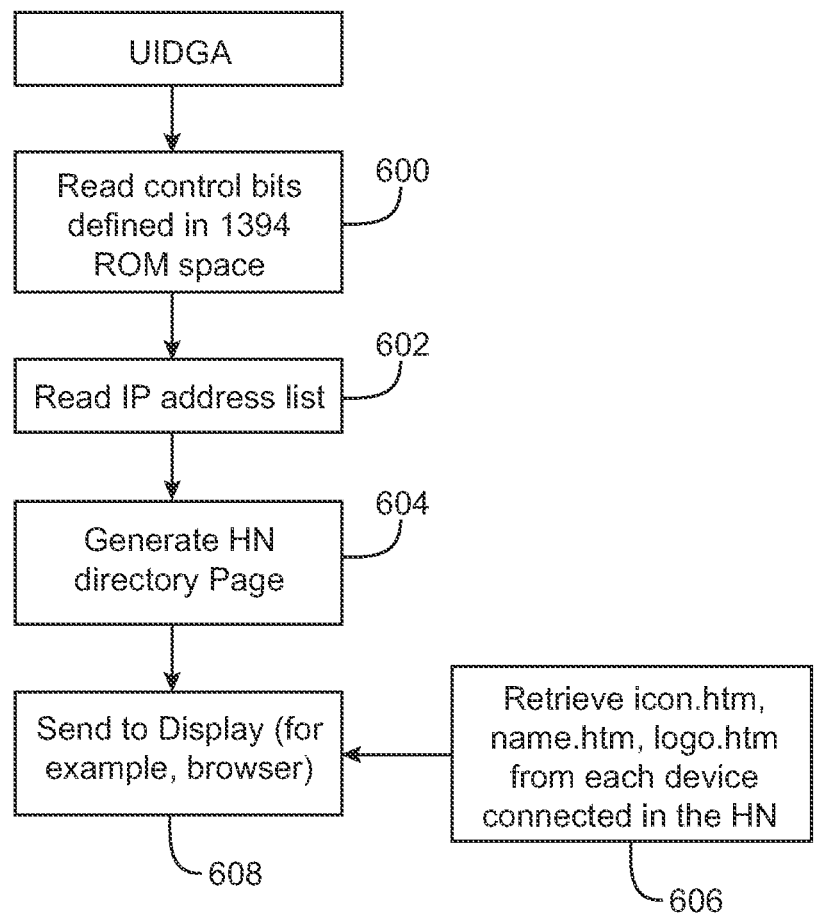
FIG. 11 shows an example flow diagram for user interface agent in the home network in connection with the functional block diagrams in FIG. 9a-c; and Appendices 1-4, illustrative examples for: (1) Top-Level Page description 250 (Appendix 1); (2) Background.htm (Appendix 2); (3) Icon.htm (Appendix 4); and (4) Name.htm (Appendix4).

UI devices execute the following software processes to generate and display views 220 of the network 100/300: (1) 1394 Device Discovery Agent 404 described above, (2) UI Description Generation Agent (UIDGA) 408, and (3) GUI Generation and Run-Time (e.g., Web Browser 200) process 410. Referring to FIG. 11, in one embodiment, a UIDGA agent 408 in a device performs steps including polling the IP address configuration bits in the device's own 1394 ROM 402 to ensure completion of the FWHCP agent 406, prior to accessing any further IP information (step 600). Upon completion of FWHCP agent 406, using the count of devices generated by, the 1394DDA agent 404, the UIDGA agent 408 then accesses the control word in each device currently connected to the network, to determine the settings for the 'configuration operating' false, and 'in-use' IP addresses bits (the UIDGA agent 408 makes the top-level HTML page, HN_Directory page, 220 shown by e.g., in FIGS. 5-6). Thereafter, the UIDGA agent 408 reads the actual in-use IP address value, and builds a complete list of the IP addresses of the devices currently connected to the network 300. The IP address list includes information (e.g., Icon, Logo, Name, etc.) from every device, and is written in HTML by using the IP address of each device. Before it can include the addresses, the UIDGA 408 finds the address of each device by accessing each device and checking to see which address is in use by reading Table 9, Discovery_control_bit, control bit (Bit 0). Then UIDGA 408 reads Table 7 Address either Built_in or Assigned. For devices that communicate to bridged networks, as determined by the presence of the extension IP address list entry in that device's 1394 ROM 402, the UIDGA agent 408 reads the extension IP-addresses from the list (IP_Address_Extension_Leaf) to allow those devices to be included in the GUI 220. The entry BC (IP_Address_Extension_Leaf) contains a reference link address that points to the actual data leaf. Devices on the attached bridged network are only included in the IP_Address_Extension_Leaf list if they also support the 1394WEB type of service i.e. they have Web Server and Icon.HTM etc and Control pages ('index.htm).

The UIDGA agent 408 reads the IP address list (step 602) and generates the top-level network UI description 250 (FIG. 9*c*) in e.g. HTML (e.g., Appendix 1) using the IP address list (UIDGA outputs the HN_Directory, top-level network UI page, HTML file) (step 604). The UIDGA agent 408 uses the IP Addresses in the hypertext links to each device for the icon.htm, name.htm and logo.htm files. UIDGA writes an HTML file including the references to each discovered device's HTML page i.e. ICON.HTM, NAME.HTM, LOGO.HTM (e.g., Appendix 2, 3, 4). The UIDGA agent 408 then uses HTML files to reference items including the icon and logo graphics files and name data, rather than including the raw icon.gif or logo.gif and raw name text in the top level UI description 250 (step 606). This allows said items to be changed by the corresponding device to reflect current status, customized by the manufacturer or configured by the user at the device, without causing any change in the top-level HTML UI description 250 in the controlling UI device. Though one graphic per device is shown in the example GUI pages 220 (FIGS. 5-6), customization allows inclusion of more than one graphic file referenced by ICON.HTM or LOGO.HTM and more text in the NAME.HTM. In one embodiment, HTML frames are utilized to implement the UI description 250 as showing in examples further below. Use of frames stabilizes the appearance of the GUI 220 in the event of 'bad citizen' devices. For example a device presenting too many words or overly large text in its 'name' frame will only affect that device's GUI look (by having some of the words truncated and not displayed) and not adversely affect the appearance of the whole Top-level GUI 220 in the UI device. The UIDGA then invokes the GUI generation process 410 (e.g., browser) in a client device to generate and display a user interface (step 608).

GUI Generation and Run-Time Processes

The GUI generation process 410 (e.g., Web Browser 200) utilizes the UI description 250 in e.g. HTML to generate GUI pages 220 on UI devices. In one example, to provide keyboard-less operation for consumer electronics devices (e.g., DTV) the Browser 200 at start-up defaults to reading and rendering a locally generated 'top-level-devices.html' description 250 to generate the network top-level control GUI 220. Locally as used here means in the same device (a UI device having a UIDGA that generates the device's own HN Directory (top-level) GUI of the network devices). HN Directory, Top level Network UI and Discovery page are the same. For personal computers (PC) with keyboard this need not be the default. For CE devices, launch of the Browser 200 is delayed until after completion of the UIDGA default page 250 generation by the UIDGA agent 408. In the event that UIDGA agent 408 cannot complete its tasks, then the Browser 200 displays an alternative UI page 220 showing a network configuration error occurred (e.g., "Unable to generate the HN_Directory Page because of xxxxxx. Try disconnecting device xxxxxxx. Network configuration error number xxxxxx occurred. Contact service Tel service xxx-xxx-xxxx or Web service http://www.service.com.")

To generate the GUI 220, the Browser 200 fetches the 'icon.htm', 'name.htm' and 'logo.htm' files from device information 202, 204 in each referenced device (i.e., in the UI description, where for example ICON.HTM is in the HN_Directory Page HTML file) as defined by the HTML UI description 250. The contents of these pages 202, 204 (e.g. the icon graphic) need not be static and can be altered dynamically to reflect device status change, or after user customization. In order to display the most current top-level page 220, the Browser 200 does not cache the 'icon.htm', 'name.htm' and 'logo.htm' files. In another version, a check is always made first to determine if the device has made any changes to the HTML files 202, 204 it holds. HTTP "Conditional get" is used for checking the status of controlled device. Depending on the status code returned, the Browser 200 will either read from its cache or fetch a fresh or updated copy the HTML file 202, 204 from the devices. The HWW GUI display is not affected unless there is any change of the status of the controlled device.

The browser 200 does not attempt to display the top-level FIN directory until it has been completely generated. If the HTML 250 is not generated within some reasonable amount of time, the browser displays an alternate page. If a network configuration error is the source of the problem, the alternate page might provide some technical support or user diagnostic assistance.

Whenever the user returns to the top-level HN directory or causes it to be refreshed, the browser 200 redisplays the page 220 in its entirety. This is necessary because the HTML 250 that underlies the top-level HN directory may have been regenerated if a device has been added to or removed from the network 100. It is also possible for device icons to be updated to reflect changes in their device's operating state. As such, browsers implemented by EIA-775.1 devices use HTTP "conditional get" requests to determine whether or not fresh copies of web pages or graphics are retrieved from the server.

In this aspect, the present invention provides a User Interface description where user discovery of devices is thus made entirely with references (i.e. in the abstract), where the references are 'containers' for the discovery information (e.g., text and/or graphics) of each device and resident on each device. Each 'container' includes actual textual information and/or references to one or more graphics formatted information files where each file may include one or more images and/or text. Use of the reference 'containers' allows each device to choose its preferred UI content or graphics format or alter its UI content to be displayed (by changing the text or graphic information referred to) without need to have the UI description page altered in any way. Therefore, communication of changes with the generating agent software of the Discovery UI description is not required. In one version, devices reference their e.g. ICON and LOGO graphics files indirectly using HTML files enabled by creating the network Top-level description using HTML frames. Similarly the device name that is displayed under the icon is represented by NAME HTML file. HTML files are used to reference e.g. the icon and logo graphics files and name data rather than include the raw icon.gif or logo.gif and raw name text. This allows the item to be changed to reflect current status, customized by the manufacturer or user configured at the device without causing any change in the top-level HTML description. This level of abstraction allows the Top-level U1 description to be always the same regardless of the graphics ICON and LOGO file names and types and NAME text to be displayed. Also the device may use different, multiple or dynamically change the graphics files and text displayed in the Top-level GUI without the change needing to be communicated to the UIDGA. The change is automatically included whenever the GUI is redisplayed. Use of frames also stabilizes the GUI display in the event of bad citizen devices using non-displayable graphics or text as the error is confined to the particular frame and doesn't affect the whole GUI. The change is automatically included whenever the GUI is redisplayed.

In one example, network devices top-level UI description is generated independently by any network device and certainly by devices capable of displaying UI (UI device). Generating a user interface in each device rather than generating a centrally UI, allows a device to show its own device icon/text preferentially in the GUI. In addition each GUI is manufacturer customizable, user configurable and also more reliable because it does not depend on another device e.g. a single central server. This is demonstrated with the 1394 scheme above. Multiple UI generation is enabled because all device IP addresses are accessible via the 1394 interface. UI devices (with Browser) include UIDGA agent to generate their own top-level GUI description after a 1394 reset cycle when a device attached or power-up.

All UI devices independently generate a top-level UI page for control for the local network. This is different from the conventional WWW operation wherein users access the same top level page. According to one version the present invention, the client device (e.g., PC) dynamically generates a locally saved default page file for any purpose, allowing each UI device (e.g., DTV) to generate a different view of the home network e.g. with a larger more prominent icon for its own display. Further manufacturers have scope to make their own GUI design better then another. In addition later, improved Browser and Web technology designs need not be hampered by earlier technology.

Referring to Appendices 1-4, illustrative examples for the following are provided: (1) Top-Level Page description 250 (Appendix 1); (2) Background.htm (Appendix 2); (3) Icon.htm (Appendix 4); and (4) Name.htm (Appendix4).

Although the present invention has been described in considerable detail with regard to the preferred versions thereof, other versions are possible. Therefore, the appended claims should not be limited to the descriptions of the preferred versions contained herein.

What is claimed is:

1. A method for providing a user interface for controlling devices that are currently connected to a network, the method comprising:
   displaying a user interface on one or more devices connected to the network capable of displaying a user interface, the user interface including at least one reference associated with each of said devices connected to the network for user selection of said one or more devices that are currently connected to the network; and
   in response to selection of a reference associated with a device from the user interface, using the selected reference for communicating with the selected device over the network to access user interface information for the selected device and dynamically generating a web-based control page for display on a browser for user interaction with the selected device via the web-based control page using the accessed user interface information, wherein the accessed user interface information comprises graphical user interface information for generating a graphical user interface for the web-based control page,
   wherein the web-based control page is generated based on the accessed user interface information from the selected device.

2. The method of claim 1, wherein said accessed user interface information for the selected device comprises an HTML page contained in that selected device for generating the user interface.

3. The method of claim 1, wherein displaying the user interface comprises displaying the user interface on a browser on said one or more devices capable of displaying a user interface.

4. The method of claim 1, further comprising:
   connecting at least one client device to the network capable of displaying a user interface; and
   displaying a user interface on the client device for controlling server devices that are currently connected to the network.

5. The method of claim 1, wherein:
   the accessed user interface information resides in each device, and further includes a user control interface description for user interaction with the device,
   the method further comprising, upon detecting user selection of a device from the user interface, using the associated reference to access the selected device and obtain the user control interface description in the selected device, and then displaying the obtained user control interface description as the control page for user command and control of the selected device.

6. The method of claim 1, further comprising generating the user interface such that the reference in that user interface provides access to at least the information for each associated device.

7. The method of claim 1, further comprising generating the user interface such that the user interface further includes device data corresponding to each device based on the user interface information obtained from each device.

8. The method of claim 1, wherein the accessed user interface information in each device includes device identification information and device description information.

9. The method of claim 1, wherein the accessed user interface information in each device includes a user control interface description for user interaction with the device.

10. The method of claim 9, further comprising:
    generating each user interface such that each reference in that user interface is linked to at least the user control interface description in each corresponding device; and
    detecting user selection of a device from one of said user interfaces, and using a reference in the user interface to access the control interface description in the device and then display the control interface description as a control page for user command and control of the device.

11. The method of claim 9, further comprising generating each user interface wherein that user interface further includes device data corresponding to each device based on the information obtained from each device, the device data providing reference to the user control interface description in each device.

12. The method of claim 1, wherein displaying the control page comprises:
    accessing said selected device in response to the selection of the reference associated with the selected device, and accessing the information contained in the selected device;
    generating the control page including the device data corresponding to said selected device using the accessed user interface information contained in the selected device; and
    displaying the control page on the one or more devices.

13. The method of claim 1, wherein the web-based control page is generated by receiving the information for the selected device from the selected device.

14. The method of claim 1, wherein the user interface for controlling the selected device is generated from the selected device without accessing a remote controlled device memory.

15. The method of claim 1, wherein the reference associated with the selected application device provides each device with a choice of preferred user interface content, graphics format or change of user interface content without altering a user interface description page.

16. The method of claim 15, wherein communication of changes of the user interface description page is unnecessary.

17. A webpage-based network system for performing a service, comprising:
- a physical layer including a communication medium used by devices to communicate with each other;
- one or more devices connected to the physical layer, each of the one or more devices are configured to store information including device description information;
- an agent process in each of the one or more devices that uses a computing device to:
  - obtain device description information from the one or more devices;
  - dynamically generate a webpage-based user interface utilizing the obtained device description information, wherein the obtained device description information comprises graphical user interface information for generating graphics for the webpage-based user interface, the webpage-based user interface including one or more references associated with the information in one or more of said devices for changing information included in the device description information;
  - display said user interface on one or more client devices connected to the network, each client device including a browser capable of displaying the webpage-based user interface, for user control of said one or more devices; and
  - in response to selection of a reference associated with a device from the webpage-based user interface via a browser, use the reference to access the selected device and access the information in the selected device to display a dynamically-generated control interface using the accessed information of the selected device for user interaction with the selected device,
- wherein the control interface is generated using the information accessed from the selected device.

18. The system of claim 17, wherein said accessed information in each device comprises an HTML page contained in that device that is used for generating the control interface.

19. The system of claim 17, wherein each agent displays the user interface on a browser on said one or more devices capable of displaying a user interface.

20. The system of claim 17, further comprising at least one client device connected to the network capable of displaying a user interface, wherein the one or more agents display a user interface on the client device, for controlling devices that are currently connected to the network.

21. The system of claim 17, wherein at least one of the devices currently connected to the network is capable of displaying a user interface, and the one or more agents display a user interface on said at least one device, for controlling the devices that are currently connected to the network.

22. The system of claim 17, wherein each agent generates a user interface such that the reference in the generated user interface provides access to at least the information in each corresponding device.

23. The system of claim 17, wherein each agent generates a user interface such that the user interface further includes device data corresponding to each device based on the portion of information obtained from each device.

24. The system of claim 17, wherein the accessed information in each device includes device identification information.

25. The system of claim 17, wherein the accessed information is stored in non-volatile memory in each device and includes a user control interface description for user interaction with the device.

26. The system of claim 25, wherein each agent generates each user interface such that each reference in that user interface is linked to at least the user control interface description in each corresponding device, and upon detecting user selection of a device from one of said user interfaces, the agent uses a reference in the user interface of the selected device to access the control interface description in the selected device and then display the control interface description as a control interface for user command and control of the selected device.

27. The system of claim 25, wherein each agent generates a user interface that includes device data corresponding to each device based on the device description information obtained from each device, the device data providing reference to the user control interface description in each device.

28. The system of claim 17, wherein each agent displays the control interface by:
- accessing said selected device in response to the selection of the reference associated with the selected device, and accessing the information contained in the selected device;
- generating the control interface including the device data corresponding to said selected device using the accessed information contained in the selected device; and
- displaying the control interface on one or more devices connected to the network capable of displaying a user interface.

29. A network system for performing a service, comprising:
- a physical layer including a communication medium used by devices to communicate with each other;
- multiple devices connected to the physical layer, said multiple devices are configured to store information including device information; and
- an agent process that uses a computing device to:
  (a) obtain device information for devices currently connected to the network from the devices;
  (b) dynamically generate a webpage-based user interface based at least on the obtained device information, wherein obtained device information comprises graphical user interface information for generating graphics for the webpage-based user interface, and the user interface including one or more references associated with the information in one or more of said devices currently connected to the network, wherein said references are used for changing information included in the obtained device information;
  (c) display said webpage-based user interface on one or more client devices connected to the network capable of displaying the webpage-based user interface, for user control of said devices that are currently connected to the network; and
  (d) in response to selection of a reference associated with a device from the webpage-based user interface, use the selected reference for accessing information for the device from the device to display a webpage-based control interface on a web browser using the accessed information of the selected device for user interaction with the selected device,
- wherein the control interface is generated based on the information accessed from the selected device.

30. The system of claim 29, wherein said accessed information in each device comprises an HTML page contained in non-volatile memory in that device.

31. The system of claim 29, wherein each agent displays a user interface on a browser on said one or more devices capable of displaying a user interface.

32. The system of claim 29, further comprising at least one client device connected to the network capable of displaying a user interface, wherein the one or more agents display a user interface on the client device, for controlling devices that are currently connected to the network.

33. The system of claim 29, wherein at least one of said devices currently connected to the network is capable of displaying a user interface, and the one or more agents display a user interface on said at least one device for controlling devices that are currently connected to the network.

34. The system of claim 29, wherein each agent generates a user interface such that the reference in the generated user interface provides access to at least the information in each corresponding device.

35. The system of claim 29, wherein each agent generates each user interface such that the user interface further includes device data corresponding to each device based on the information obtained from each device.

36. The system of claim 29, wherein the accessed information in each device includes device identification information.

37. The system of claim 29, wherein the accessed information in each device includes a user control interface description for user interaction with the device.

38. The system of claim 37, wherein each agent generates each user interface such that each reference in that user interface is linked to at least the user control interface description in each corresponding device, and upon detecting user selection of a device from one of said user interfaces, the agent uses a reference in the user interface of the selected device to access the control interface description in the selected device and then display the control interface description as a generated control interface for user command and control of the selected device.

39. The system of claim 37, wherein each agent generates each user interface wherein the generated user interface further includes device data corresponding to each device based on the information obtained from each device, the device data providing reference to the user control interface description in each device.

40. The system of claim 29, wherein each agent displays the control interface by:

accessing said selected device in response to the selection of the reference associated with the selected device, and accessing the information contained in the selected device generating the control interface including the device data corresponding to said selected device using the accessed information contained in the selected device; and displaying the control interface on one or more devices connected to the network capable of displaying a user interface.

41. A method for displaying a webpage-based user interface for controlling application devices that are currently connected to a network, comprising:

obtaining a first set of device information from the application devices;

dynamically generating a webpage-based user interface based at least on the obtained first set of device information, wherein the obtained first set of device information comprises graphical user interface information for generating the webpage-based user interface, the webpage-based user interface including one or more references associated with a second set of device information stored in one or more of said application devices;

displaying said webpage-based user interface on a web browser for user control of said application devices; and in response to selection of a reference from the webpage-based user interface associated with an application device, displaying a control page on the web browser by accessing the selected application device over the network and accessing the second set of device information of said selected application device from said selected application device, wherein the control interface is generated based on the first and second sets of information accessed from the selected device.

42. The method of claim 41, wherein displaying the control page comprises:

accessing said selected application device in response to the selection of the reference associated with the selected application device, and accessing the second set of device information contained in the selected device;

generating the control page using the accessed second set of device information contained in the selected device; and displaying the control page on the web browser in a control device.

* * * * *